United States Patent
Diehl et al.

(10) Patent No.: US 11,878,651 B2
(45) Date of Patent: Jan. 23, 2024

(54) VARIABLE BEHAVIOR CONTROL MECHANISM FOR A MOTIVE SYSTEM

(71) Applicant: EDDY CURRENT LIMITED PARTNERSHIP, Wellington (NZ)

(72) Inventors: Andrew Karl Diehl, Wellington (NZ); Peter Scott, Wellington (NZ); Benjamin Woods, Wellington (NZ); Lincoln Frost, Wellington (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 490 days.

(21) Appl. No.: 17/179,258

(22) Filed: Feb. 18, 2021

(65) Prior Publication Data

US 2021/0316697 A1  Oct. 14, 2021

Related U.S. Application Data

(63) Continuation of application No. 16/063,589, filed as application No. PCT/NZ2016/050200 on Dec. 16, 2016, now Pat. No. 10,953,848.

(30) Foreign Application Priority Data

Dec. 18, 2015 (NZ) ........................ 715391

(51) Int. Cl.
  *G01P 15/08*  (2006.01)
  *B60R 22/405*  (2006.01)
  *B60R 22/40*  (2006.01)

(52) U.S. Cl.
  CPC ........ *B60R 22/405* (2013.01); *G01P 15/0891* (2013.01); *B60R 2022/401* (2013.01); *Y02B 10/30* (2013.01)

(58) Field of Classification Search
  CPC . B60R 22/405; B60R 2022/401; B60R 22/40; B60R 1/32; G01P 15/0891; Y02B 10/30; A62B 1/10
  See application file for complete search history.

(56) References Cited

U.S. PATENT DOCUMENTS 638,950 A * 12/1899 Addison et al. ......... A62B 1/10
  188/77 R
2,058,024 A  10/1936 Logan, Jr.
(Continued)

FOREIGN PATENT DOCUMENTS

CN  1783674 A  6/2006
CN  101820952 A  9/2010
(Continued)

OTHER PUBLICATIONS

Extended European Search Report, dated Jul. 11, 2017, for European Application No. 14872681.3-1809, 10 pages.
(Continued)

*Primary Examiner* — Paul N Dickson
*Assistant Examiner* — Maxwell L Meshaka
(74) *Attorney, Agent, or Firm* — Seed IP Law Group LLP

(57) ABSTRACT

Variable behaviour control mechanism with a variety of motion characteristics, the mechanism comprising means to measure a plurality of motion characteristics and to activate systems when a threshold of the motion characteristics is reached. The mechanism described is, for example, a vehicle seat belt and the mechanism minimises or prevents unwanted activation of line extension or retraction of the seat belt. A first mechanism is described where activation occurs between at least one primary system and at least one secondary system when a combination of the sensed motion characteristics achieves a threshold. A second mechanism is described where activation occurs between at least one primary system and at least one secondary system when at
(Continued)

least one sensed motion characteristic achieves a threshold, the threshold being modified based on at least one further motion characteristic. A method of use of the above mechanisms is also described.

19 Claims, 15 Drawing Sheets

(56) References Cited

U.S. PATENT DOCUMENTS

| | | | |
|---|---|---|---|
| 2,122,312 A | 6/1938 | Cassion | |
| 2,122,315 A | 6/1938 | Fosty et al. | |
| 2,272,509 A | 2/1942 | Cavallo | |
| 2,409,009 A | 10/1946 | Bakke | |
| 2,428,104 A | 9/1947 | Winther | |
| 2,437,871 A | 3/1948 | Wood | |
| 2,492,776 A | 12/1949 | Winther | |
| 2,771,171 A | 11/1956 | Schultz | |
| 2,807,734 A | 9/1957 | Lehde | |
| 3,364,795 A | 1/1968 | De Coye De Castelet | |
| 3,447,006 A | 5/1969 | Bair | |
| 3,721,394 A | 3/1973 | Reiser | |
| 3,868,005 A | 2/1975 | McMillan | |
| 3,934,446 A | 1/1976 | Avitzur | |
| 3,962,595 A | 6/1976 | Eddens | |
| 3,967,794 A | 7/1976 | Fohl | |
| 4,078,719 A | 3/1978 | Durland et al. | |
| 4,093,186 A | 6/1978 | Golden | |
| 4,224,545 A | 9/1980 | Powell | |
| 4,271,944 A | 6/1981 | Hanson | |
| 4,306,688 A | 12/1981 | Hechler, IV | |
| 4,359,139 A | 11/1982 | Bloder | |
| 4,416,430 A | 11/1983 | Totten | |
| 4,434,971 A | 3/1984 | Cordrey | |
| 4,544,111 A | 10/1985 | Nakajima | |
| 4,561,605 A | 12/1985 | Nakajima | |
| 4,567,963 A | 2/1986 | Sugimoto | |
| 4,612,469 A | 9/1986 | Muramatsu | |
| 4,676,452 A | 6/1987 | Nakajima | |
| 4,690,066 A | 9/1987 | Morishita et al. | |
| 4,708,364 A | 11/1987 | Doty | |
| 4,708,366 A | 11/1987 | Doty | |
| 4,729,525 A | 3/1988 | Rumpf | |
| 4,826,150 A | 5/1989 | Minoura | |
| 4,846,313 A * | 7/1989 | Sharp | A62B 35/0093 242/396.5 |
| 4,895,317 A | 1/1990 | Rumpf et al. | |
| 4,938,435 A | 7/1990 | Varner et al. | |
| 4,957,644 A | 9/1990 | Price et al. | |
| 4,974,706 A | 12/1990 | Maji et al. | |
| 5,054,587 A | 10/1991 | Matsui et al. | |
| 5,064,029 A | 11/1991 | Araki et al. | |
| 5,084,640 A | 1/1992 | Morris et al. | |
| 5,205,386 A | 4/1993 | Goodman et al. | |
| 5,248,133 A | 9/1993 | Okamoto et al. | |
| 5,272,938 A | 12/1993 | Hsu et al. | |
| 5,342,000 A | 8/1994 | Berges et al. | |
| 5,392,881 A | 2/1995 | Cho et al. | |
| 5,441,137 A | 8/1995 | Organek et al. | |
| 5,465,815 A | 11/1995 | Ikegami | |
| 5,477,093 A | 12/1995 | Lamb | |
| 5,483,849 A | 1/1996 | Orii et al. | |
| 5,495,131 A | 2/1996 | Goldie et al. | |
| 5,636,804 A | 6/1997 | Jeung | |
| 5,692,693 A | 12/1997 | Yamaguchi | |
| 5,711,404 A | 1/1998 | Lee | |
| 5,712,520 A | 1/1998 | Lamb | |
| 5,722,612 A | 3/1998 | Feathers | |
| 5,742,986 A | 4/1998 | Corrion et al. | |
| 5,779,178 A | 7/1998 | McCarty | |
| 5,791,584 A | 8/1998 | Kuroiwa | |
| 5,822,874 A | 10/1998 | Nemes | |
| 5,862,891 A | 1/1999 | Kröger et al. | |
| 5,928,300 A | 7/1999 | Rogers et al. | |
| 6,041,897 A | 3/2000 | Saumweber et al. | |
| 6,042,517 A | 3/2000 | Gunther et al. | |
| 6,051,897 A | 4/2000 | Wissler et al. | |
| 6,062,350 A | 5/2000 | Spieldiener et al. | |
| 6,086,005 A | 7/2000 | Kobayashi et al. | |
| 6,209,688 B1 | 4/2001 | Kuwahara | |
| 6,220,403 B1 | 4/2001 | Kobayashi et al. | |
| 6,279,682 B1 | 8/2001 | Feathers | |
| 6,293,376 B1 | 9/2001 | Pribonic | |
| 6,412,611 B1 | 7/2002 | Pribonic | |
| 6,460,828 B1 | 10/2002 | Gersemsky et al. | |
| 6,466,119 B1 | 10/2002 | Drew | |
| 6,523,650 B1 | 2/2003 | Pribonic et al. | |
| 6,533,083 B1 | 3/2003 | Pribonic et al. | |
| 6,557,673 B1 | 5/2003 | Desta et al. | |
| 6,561,451 B1 | 5/2003 | Steinich | |
| 6,659,237 B1 | 12/2003 | Pribonic | |
| 6,756,870 B2 | 6/2004 | Kuwahara | |
| 6,793,203 B2 | 9/2004 | Heinrichs et al. | |
| 6,810,997 B2 | 11/2004 | Schreiber et al. | |
| 6,918,469 B1 | 7/2005 | Pribonic et al. | |
| 6,962,235 B2 | 11/2005 | Leon | |
| 6,973,999 B2 | 12/2005 | Ikuta et al. | |
| 7,011,607 B2 | 3/2006 | Kolda et al. | |
| 7,014,026 B2 | 3/2006 | Drussel et al. | |
| 7,018,324 B1 | 3/2006 | Lin | |
| 7,279,055 B2 | 10/2007 | Schuler | |
| 7,281,612 B2 | 10/2007 | Hsieh | |
| 7,281,620 B2 | 10/2007 | Wolner et al. | |
| 7,513,334 B2 | 4/2009 | Calver | |
| 7,528,514 B2 | 5/2009 | Cruz et al. | |
| 7,971,820 B2 | 7/2011 | Kitazawa et al. | |
| 7,984,796 B2 | 7/2011 | Pribonic | |
| 8,037,978 B1 | 10/2011 | Boren | |
| 8,272,476 B2 | 9/2012 | Hartman et al. | |
| 8,424,460 B2 | 4/2013 | Lerner et al. | |
| 8,490,751 B2 | 7/2013 | Allington et al. | |
| 8,511,434 B2 | 8/2013 | Blomberg | |
| 8,556,234 B2 | 10/2013 | Hartman et al. | |
| 8,567,561 B2 | 10/2013 | Strasser et al. | |
| 8,601,951 B2 | 12/2013 | Lerner | |
| 8,851,235 B2 | 10/2014 | Allington et al. | |
| 9,016,435 B2 | 4/2015 | Allington et al. | |
| 9,199,103 B2 | 12/2015 | Hetrich et al. | |
| 9,242,128 B2 | 1/2016 | Macy | |
| 9,962,588 B2 | 5/2018 | Allington et al. | |
| 10,971,988 B2 * | 4/2021 | Diehl | B60L 7/28 |
| 11,226,016 B1 * | 1/2022 | Elias | F16D 41/12 |
| 2002/0050542 A1 * | 5/2002 | Nagata | B60R 22/40 242/379.1 |
| 2002/0162477 A1 | 11/2002 | Palumbo | |
| 2002/0179372 A1 | 12/2002 | Schreiber et al. | |
| 2003/0116391 A1 | 6/2003 | Desta et al. | |
| 2003/0168911 A1 | 9/2003 | Anwar | |
| 2003/0211914 A1 | 11/2003 | Perkins et al. | |
| 2004/0055836 A1 | 3/2004 | Pribonic et al. | |
| 2004/0073346 A1 | 4/2004 | Roelleke | |
| 2004/0168855 A1 | 9/2004 | Leon | |
| 2004/0191401 A1 | 9/2004 | Bytnar et al. | |
| 2005/0051659 A1 * | 3/2005 | Wolner | A62B 35/0093 242/383.5 |
| 2005/0082410 A1 | 4/2005 | Tanaka et al. | |
| 2005/0117258 A1 | 6/2005 | Ohta et al. | |
| 2005/0189830 A1 | 9/2005 | Corbin, III et al. | |
| 2005/0263356 A1 | 12/2005 | Marzano et al. | |
| 2006/0186252 A1 | 8/2006 | Kitazawa et al. | |
| 2006/0214043 A1 | 9/2006 | Nomura | |
| 2006/0219498 A1 | 10/2006 | Organek et al. | |
| 2006/0278478 A1 | 12/2006 | Pribonic et al. | |
| 2007/0000741 A1 | 1/2007 | Pribonic et al. | |
| 2007/0001048 A1 | 1/2007 | Wooster et al. | |
| 2007/0135561 A1 | 6/2007 | Rath et al. | |
| 2007/0228202 A1 | 10/2007 | Scharf et al. | |
| 2007/0228713 A1 | 10/2007 | Takemura | |
| 2007/0256906 A1 | 11/2007 | Jin et al. | |
| 2007/0290091 A1 * | 12/2007 | Mori | B60R 22/405 242/383.1 |
| 2008/0059028 A1 | 3/2008 | Willerton | |
| 2008/0074223 A1 | 3/2008 | Pribonic | |

(56) References Cited

U.S. PATENT DOCUMENTS

| | | |
|---|---|---|
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2009/0321550 A1 | 12/2009 | Boyer et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2010/0231402 A1 | 9/2010 | Flynt et al. |
| 2011/0084158 A1 | 4/2011 | Meillet et al. |
| 2011/0114907 A1 | 5/2011 | Hartman et al. |
| 2011/0147125 A1 | 6/2011 | Blomberg |
| 2011/0166744 A1 | 7/2011 | Lu et al. |
| 2011/0174914 A1 | 7/2011 | Yang |
| 2011/0175473 A1 | 7/2011 | Kitabatake et al. |
| 2011/0240403 A1 | 10/2011 | Meillet |
| 2011/0297778 A1 | 12/2011 | Meillet et al. |
| 2012/0055740 A1 | 3/2012 | Allington et al. |
| 2012/0118670 A1 | 5/2012 | Olson et al. |
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0105247 A1 | 5/2013 | Casebolt |
| 2013/0118842 A1 | 5/2013 | Lerner |
| 2013/0186721 A1 | 7/2013 | Bogdanowicz et al. |
| 2014/0048639 A1 | 2/2014 | Allington et al. |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2015/0352380 A1 | 12/2015 | Huang et al. |
| 2016/0052401 A1 | 2/2016 | McGowan et al. |
| 2016/0236647 A1* | 8/2016 | Sato ................ B60R 22/405 |
| 2016/0317936 A1 | 11/2016 | Diehl et al. |
| 2016/0339867 A1 | 11/2016 | Choi et al. |
| 2016/0360738 A1 | 12/2016 | Richardson |
| 2017/0237313 A1 | 8/2017 | Diehl et al. |
| 2017/0244313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |
| 2017/0361136 A1* | 12/2017 | Wu ................. A62B 35/0093 |
| 2018/0245658 A1 | 8/2018 | Diehl et al. |
| 2018/0264296 A1 | 9/2018 | Diehl et al. |
| 2018/0269767 A1 | 9/2018 | Diehl et al. |
| 2018/0269768 A1 | 9/2018 | Diehl et al. |
| 2018/0269769 A1 | 9/2018 | Allington et al. |

FOREIGN PATENT DOCUMENTS

| | | | |
|---|---|---|---|
| CN | 202203305 U | | 4/2012 |
| CN | 102497085 A | | 6/2012 |
| CN | 102627063 A | | 8/2012 |
| CN | 103244577 A | | 8/2013 |
| CN | 103326538 A | | 9/2013 |
| CN | 115177885 A | * | 10/2022 |
| DE | 93 00 966 U1 | | 3/1993 |
| DE | 10 2005 032 694 A1 | | 1/2007 |
| EP | 0 247 818 A2 | | 12/1987 |
| EP | 0273584 A1 | | 7/1988 |
| EP | 0383520 A2 | | 8/1990 |
| EP | 0 460 494 A1 | | 12/1991 |
| EP | 0 909 684 A2 | | 4/1999 |
| EP | 1 094 240 A2 | | 4/2001 |
| EP | 1 401 087 A1 | | 3/2004 |
| EP | 1 432 101 A1 | | 6/2004 |
| EP | 1 480 320 A1 | | 11/2004 |
| EP | 1 564 868 A1 | | 8/2005 |
| EP | 1 244 565 B1 | | 7/2006 |
| EP | 2 777 773 A2 | | 9/2014 |
| EP | 4019092 A1 | * | 6/2022 |
| FR | 2617050 A1 | * | 12/1988 |
| GB | 721748 A | | 1/1955 |
| GB | 908128 A | | 10/1962 |
| GB | 1011757 A | | 12/1965 |
| GB | 2 340 461 A | | 2/2000 |
| GB | 2 352 644 A | | 2/2001 |
| GB | 2 352 645 A | | 2/2001 |
| GB | 2 352 784 A | | 2/2001 |
| GB | 2 357 563 A | | 6/2001 |
| JP | 49-097163 A | | 9/1974 |
| JP | S53-113528 U | | 9/1978 |
| JP | S54155524 A | | 12/1979 |
| JP | S5668546 U | | 6/1981 |
| JP | 56-107092 | | 8/1981 |
| JP | 58-25152 U | | 2/1983 |
| JP | S58101657 U | | 7/1983 |
| JP | 60-259278 A | | 12/1985 |
| JP | 63-64542 A | | 3/1988 |
| JP | H05-72684 A | | 3/1993 |
| JP | 5-296287 A | | 11/1993 |
| JP | H05-84347 U | | 11/1993 |
| JP | 8-252025 A | | 10/1996 |
| JP | 10-98868 A | | 4/1998 |
| JP | 10-140536 A | | 5/1998 |
| JP | H10-178717 A | | 6/1998 |
| JP | 10-304799 A | | 11/1998 |
| JP | 11-119680 A | | 4/1999 |
| JP | 11-189701 A | | 7/1999 |
| JP | 11-315662 A | | 11/1999 |
| JP | 2000-189530 A | | 7/2000 |
| JP | 2000-316272 A | | 11/2000 |
| JP | 2001-17041 A | | 1/2001 |
| JP | 2005-353123 A | | 12/2005 |
| JP | 2006-224920 A | | 8/2006 |
| JP | 2008-044470 A | | 2/2008 |
| JP | 2011-111007 A | | 6/2011 |
| JP | 2012-152316 A | | 8/2012 |
| RU | 106 462 U1 | | 7/2011 |
| WO | 95/16496 A1 | | 6/1995 |
| WO | 96/17149 A1 | | 6/1996 |
| WO | 98/47215 A1 | | 10/1998 |
| WO | 01/38123 A1 | | 5/2001 |
| WO | 03/055560 A1 | | 7/2003 |
| WO | 2007/060053 A1 | | 5/2007 |
| WO | 2008/139127 A1 | | 11/2008 |
| WO | 2009/013479 A1 | | 1/2009 |
| WO | 2009/047469 A1 | | 4/2009 |
| WO | 2009/108040 A1 | | 9/2009 |
| WO | 2009/127142 A1 | | 10/2009 |
| WO | 2010/104405 A2 | | 9/2010 |

OTHER PUBLICATIONS

Extended European Search Report, dated Mar. 29, 2018, for European Application No. 15834380.6-1201, 12 pages.

Extended European Search Report, dated Apr. 6, 2018, for European Application No. 15864540.8-1201, 26 pages.

Final Office Action, dated Feb. 28, 2017, for U.S. Appl. No. 14/464,255, Allington et al., "Braking Mechanisms," 10 pages.

MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.

North Safety Products Europe B.V., "Climbing Wall Descender: FP2/5**GDD," *Climbing Wall Descent Controllers Instruction Manual v3*, Aug. 18, 2008, 20 pages.

Notice of Allowance, dated Jul. 21, 2014, for U.S. Appl. No. 13/255,625, Allington et al., "Braking Mechanisms," 11 pages.

Office Action, dated Aug. 22, 2017, for U.S. Appl. No. 14/464,255, Allington et al., "Braking Mechanisms," 5 pages.

(56) References Cited

OTHER PUBLICATIONS

Office Action, dated Feb. 20, 2018, for U.S. Appl. No. 14/464,255, Allington et al., "Braking Mechanisms," 15 pages.
Office Action, dated Jan. 17, 2018, for U.S. Appl. No. 15/586,111, Allington et al., "Braking Mechanisms," 15 pages.
Office Action, dated Jan. 9, 2014, for U.S. Appl. No. 13/255,625, Allington et al., "Braking Mechanisms," 9 pages.
Office Action, dated Jul. 25, 2016, for U.S. Appl. No. 14/464,255, Allington et al., "Braking Mechanisms," 10 pages.
Park et al., "Torque analysis and measurements of a permanent magnet type Eddy current brake with a Halbach magnet array based on analytical magnetic field calculations," Journal of Applied Physics 115(17):17E707, 2014. (3 pages).
Trublue Auto Belays, Model TB150-12C Operator Manual, Jun. 20, 2013, 37 pages.

* cited by examiner

VARIABLE BEHAVIOR CONTROL MECHANISM FOR A MOTIVE SYSTEM

CROSS-REFERENCE TO RELATED APPLICATIONS

This application derives priority from New Zealand patent application number 715391 the contents of which as incorporated herein by reference.

BACKGROUND

Technical Field

Described herein is a variable behavior control mechanism for a motive system. More specifically, a mechanism is described with sensitivity to a variety of motion characteristics, the mechanism comprising means to measure a plurality of motion characteristics and, where the system is activated to complete some manner of movement, or movement prevention, in response to the mechanism dynamics of movement, activation only occurs as a result of sensitivity to a plurality of characteristics of motion.

Description of the Related Art

As noted above, this disclosure relates to a mechanism for a motive system whose activation alters in response to the characteristic of the dynamics of the motion of the system.

Known art systems use a single characteristic measure on the dynamic motion as the input for determining a point of activation (e.g., position, velocity, acceleration, or jerk). These systems provide an activation of the systems based of the input characteristics of a single threshold value of the measured metric. An example of this type of mechanism may be a seat belt used in a vehicle. The seat belt mechanism allows line extension and retraction however, when a sudden acceleration occurs, latches engage a stop mechanism and line extension halts. In this example the single motion characteristic measured is acceleration. No other aspects of system motion are measured or used to control the activation of the stop mechanism. This type of system is clearly effective however it is far from perfect, for example, because the system is prone to unwanted activation for example when the user fits the seatbelt and pulls the belt too rapidly.

In many situations and applications it is desired (and beneficial) to have the activation of the system vary based on the dynamics of the motion—the dynamics of the motion being determined by considering the variation in motion characteristic(s) with respect to time.

By definition, a system setting an activation threshold value based on a single characteristic measure is unable to determine activation based on a threshold set by that single characteristic measure itself.

However, if a change of the characteristic measure was determined, or the characteristic behavior of the motion with respect to a time reference was considered, or an alternative characteristic measure was considered, and a measure or assessment of this was then used in some manner with or alongside the single characteristic measured to determine the activation, then the desired system activation response could be achieved. Activation may for example be a threshold, varied by one or more motion characteristic measures or using a plurality of characteristic measures to determine a fixed activation threshold. Expressed another way, if a greater range of motion characteristics are measured, the eventual mechanism may be less prone to false activations, more likely to activate when needed and potentially more likely to activate faster than perhaps might be the case when a single motion characteristics is measured.

An aim of the mechanism described herein may be to provide an alternative variable behavior control mechanism for a motive system or at least provide the public with a choice.

Further aspects and advantages of the control mechanism and method of use will become apparent from the ensuing description that is given by way of example only.

BRIEF SUMMARY

Described herein is a variable behavior control mechanism with a variety of motion characteristics, the mechanism comprising means to reference a plurality of motion characteristics and, where the mechanism activates when a threshold is reached to complete some manner of control or control prevention in response to the motion characteristics, activation only occurring as a result of a plurality of characteristic of motion. The mechanism described is comparatively more complicated than art single motion characteristic measurement system like a simple vehicle seat belt and as a result may be used to for example, minimize or prevent unwanted activation thereby creating increased functional and application yet operate with great accuracy when activation is required.

In a first aspect, there is provided a variable behavior control mechanism in a motive system, the mechanism comprising:
  at least one primary system that is configured to undergo motion according to a kinematic relationship when a change is imposed on the primary system, the at least one primary system having:
    (a) at least one sensor that measures at least two motion characteristics of the at least one primary system according to the kinematic relationship; or
    (b) at least two sensors, the sensors each measuring at least one motion characteristics of the at least one primary system according to the kinematic relationship; and
  wherein, activation occurs between the at least one primary system and at least one secondary system when a combination of the sensed motion characteristics achieves a threshold.

In a second aspect, there is provided a variable behavior control mechanism in a motive system, the mechanism comprising:
  at least one primary system that is configured to undergo motion according to a kinematic relationship when a change is imposed on the primary system, the at least one primary system having:
    (a) at least one sensor that measures at least two motion characteristics of the at least one primary system according to the kinematic relationship; or
    (b) at least two sensors, the sensors each measuring at least one motion characteristics of the at least one primary system according to the kinematic relationship; and
  wherein, activation occurs between the at least one primary system and at least one secondary system when the at least one sensed motion characteristic achieves a threshold, the threshold being determined based on the measure of at least one further motion characteristic.

In a third aspect, there is provided a variable behavior control mechanism in a motive system, the mechanism comprising:

at least one primary system that is configured to undergo motion according to a kinematic relationship when a change is imposed on the primary system, the at least one primary system having:
- (a) at least one sensor that measures at least two motion characteristics of the at least one primary system according to the kinematic relationship; or
- (b) at least two sensors, the sensors each measuring at least one motion characteristics of the at least one primary system according to the kinematic relationship; and wherein, activation occurs between the at least one primary system and at least one secondary system when a set of criteria is met by at least two or more motion characteristics.

In a fourth aspect, there is provided a method of controlling a variable behavior control mechanism in a motive system by the steps of:
- (a) providing a mechanism substantially as described above; and
- (b) providing a motive force on the at least one primary mechanism;
- (c) referencing at least two motion characteristics;
- (d) when a threshold is reached based on the reference motion characteristics, activation occurs between the at least one primary system and the at least one secondary system.

Advantages of the above may comprise one or more of:

Differentiation between motion types—the mechanism can be tuned to distinguish different motion types based on the 'signature' of the motion. For example a free falling object is subject to a constant acceleration of 9.81 m/s$^2$ and a linearly increasing velocity while a person walking has a varying acceleration and velocity. Although both motions may reach an equal velocity or acceleration the device can have a different response the each situation;

Short fall distance/lower nuisance lock off occurrence—when the device is used in an SRL, the system can be tuned to quickly active under the correct combination of acceleration and velocity thereby obtaining short fall distance. This would occur in a free fall event. However the same device will be keep false activations during normal work events (nuisance lock off) to a minimum by differentiating the different combinations of accelerations and velocities in these events;

Tuneability—it may be possible to control the sensitivity of the device to the actual and relative values of motion (including velocity and acceleration). Likewise, it may be possible to control the sensitivity of the device to how the effects of motion (for example velocity and acceleration) are combined. Furthermore, using the effects it may be possible to control the threshold of the device at which a secondary system within the device is activated or engaged.

Increased functionality—Based on the tuneability of the device, it is possible for the device to have an increase in functionality when used in specific application, particular where the 'signatures' of the input motion in which the device should not activate are close to those where activation is essential. As will be understood, as the device has the ability to sense and activate from a range of motion characteristics, the combination of the motion characteristics, the relative thresholds of the characteristics, the accuracy of the device for determining the need to active secondary functions is significantly improved.

Quicker activation times and lower nuisance lock off occurrence—when the device is used in a self retracting lifeline (SRL) application, the activation time for the device can be improved thereby resulting in short fall distances whilst maintaining or reducing in potential nuisance lock-off events. Equally, in seat belt applications, the device can increase the useability of the product by reducing the number of accidental activations of the locking mechanism when the belt is extracted by the users whilst improving the activation time and accuracy during an actual accident or collision;

The mechanism disclosed may overcome the shortcoming of the known art systems in the way noted above, by characterizing the motion of the system through a richer set of characteristic measures. Activation of the mechanism may be determined based on variation of a threshold value of one characteristic motion measure by another (or combination of) characteristic measure(s). Alternatively, the threshold for activation may be determined by the profile of one or more characteristic measures values considered with respect to a time reference. This may be achieved mechanically, electrically/electronically, or a combination of both. The characteristic of motion may be determined instantaneously at a point in time, or over a time period.

Processors and/or algorithms may further be utilized alongside the mechanism to further tune the mechanism dynamics thus providing greater mechanism versatility.

BRIEF DESCRIPTION OF THE SEVERAL VIEWS OF THE DRAWINGS

Further aspects of the variable behavior control mechanism and method of use will become apparent from the following description that is given by way of example only and with reference to the accompanying drawings in which.

DETAILED DESCRIPTION

Figure 1:
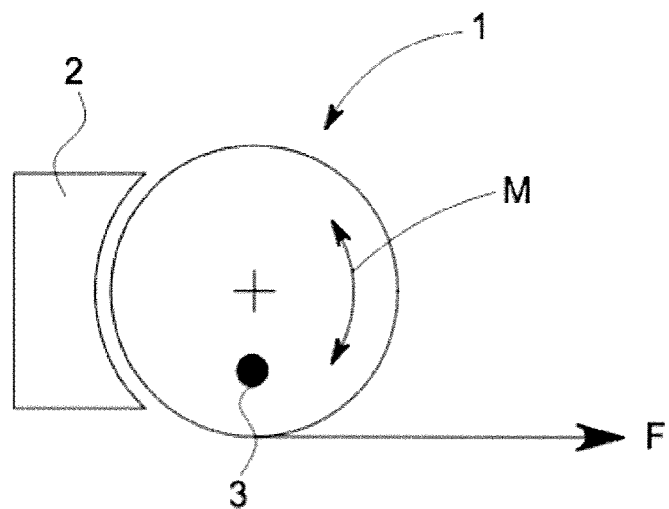
FIG. 1 illustrates one stylized embodiment of the activation mechanism.

As noted above, described herein is a variable behavior control mechanism with a variety of motion characteristics, the mechanism comprising means to reference a plurality of motion characteristics and, where the mechanism activates when a threshold is reached to complete some manner of control or control prevention in response to the motion characteristics, activation only occurring as a result of a plurality of characteristic of motion. The mechanism described is comparatively more complicated than art single motion characteristic measurement system like a vehicle seat belt and as a result may be used to for example, minimize or prevent unwanted activation thereby creating increased functional and application yet operate with great accuracy when activation is required.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e., that it will be taken to mean an inclusion of not only the listed components it directly references, but also other non-specified components or elements.

The term 'member' may refer to one part or element or a plurality of parts or elements that together achieve the function noted.

The term 'sensor' or grammatical variations thereof refers to either, or a combination of; an individual sensing element, combination of sensing elements, a sensing system, a sensing element and measurement system, a signal processing and manipulation system, and that it may be a single system or combination of systems, either combined or separated. Further, the term 'sensor' or grammatical variations thereof refers to an item or items that both references at least one motion characteristic and then undergoes some behavior itself (active) or actions some behavior on another mechanism (passive), this behavior causing or leading to an activation event. In summary, the at least one sensor is able to respond to the applied conditions imposed by the component dynamics and statics that then lead the sensor to operate directly or indirectly in response to these to achieve an activation event.

The term 'threshold' or grammatical variations thereof refers to a value, or being determined as an event that is determined from a set of motion characteristics, equating to a point at which activation action occurs.

The term 'variable behavior' or grammatical variations thereof refers to the mechanism varying its response based on a plurality of inputs, the a plurality of inputs giving a greater number of possible but yet predictable and predetermined responses than single input mechanisms. Specifically, the variable behavior may be variation with respect to one motion characteristic due to the influence of other motion characteristics.

The term 'measure' or grammatical variations thereof refers to ascertaining the size, amount, or degree of at least one mechanism motion characteristic.

The term 'signal' or grammatical variations thereof refers to at least one motion characteristic that provides an indication, warning, or command, or value, e.g., voltage, current, force, binary, reaction of the mechanism configuration or possible future predicted position.

In a first aspect, there is provided a variable behavior control mechanism in a motive system, the mechanism comprising:

at least one primary system that is configured to undergo motion according to a kinematic relationship when a change is imposed on the primary system, the at least one primary system having:

(a) at least one sensor that measures at least two motion characteristics of the at least one primary system according to the kinematic relationship; or (b) at least two sensors, the sensors each measuring at least one motion characteristics of the at least one primary system according to the kinematic relationship; and wherein, activation occurs between the at least one primary system and at least one secondary system when a combination of the sensed motion characteristics achieves a threshold.

As may be appreciated from the above, the inventors have identified a design of mechanism where activation occurs with the motion characteristic both having an absolute and relative direct measurement against the threshold and therefore singularly and combined have direct influence on the activation.

In one embodiment, activation as noted above may result when the threshold is reached, this being when the two or more motion characteristic measures reach a predefined threshold, each motion characteristic given a direct weighting.

In an alternative embodiment, activation may result when the threshold is reached, wherein at least one motion characteristic measure is given a relatively higher threshold weighting than the at least one further motion characteristic when measured against a fixed threshold.

In a second aspect, there is provided a variable behavior control mechanism in a motive system, the mechanism comprising:
- at least one primary system that is configured to undergo motion according to a kinematic relationship when a change is imposed on the primary system, the at least one primary system having:
  - (a) at least one sensor that measures at least two motion characteristics of the at least one primary system according to the kinematic relationship; or
  - (b) at least two sensors, the sensors each measuring at least one motion characteristics of the at least one primary system according to the kinematic relationship; and
- wherein, activation occurs between the at least one primary system and at least one secondary system when the at least one sensed motion characteristic achieves a threshold, the threshold being determined based on the measure of at least one further motion characteristic.

As may be appreciated from the above, the inventors in this aspect have identified a mechanism where sensing of the one or more motion characteristic influences the activation threshold that one other motion characteristic senses and activates upon. That is, the mechanism provides a means of activating when a weighted combination of motion characteristics exceed a chosen threshold while remaining un-activated or dis-engaged at all other times.

In a third aspect, there is provided a variable behavior control mechanism in a motive system, the mechanism comprising:
- at least one primary system that is configured to undergo motion according to a kinematic relationship when a change is imposed on the primary system, the at least one primary system having:
  - (a) at least one sensor that measures at least two motion characteristics of the at least one primary system according to the kinematic relationship; or
  - (b) at least two sensors, the sensors each measuring at least one motion characteristics of the at least one primary system according to the kinematic relationship; and
- wherein, activation occurs between the at least one primary system and at least one secondary system when a set of criteria is met by at least two or more motion characteristics.

In a further embodiment common to both of the above aspects, the mechanism may utilize direct sensing and activation where the mechanism is configured with at least one sensor located on the mechanism or a part thereof that senses at least one motion characteristic and, when the threshold is met the at least one sensor causes activation directly on the mechanism, system, or a part thereof.

The at least one sensor may also move with the mechanism or part thereof.

Alternatively to the above embodiment, the mechanism may utilize indirect sensing. Only indirect or remote sensing may be used. Alternatively, a combination of indirect and direct sensing may be used. For example, the mechanism may be configured with at least one sensor located remotely from the mechanism, optionally with or without a further sensor located directly on the primary system and, when the threshold is met, activation occurs with the secondary system. As may be appreciated, in an embodiment where two sensors are used, one direct on the primary system and another indirect, each sensor may sense at least one motion characteristic. By contrast, in the embodiment where only a single indirect sensor is used, the indirect sensor senses at least two motion characteristics. Also, as noted above, there may be two indirect or remote sensors, each sensing at least one motion characteristic. Where multiple indirect sensors are used, the sensors may be on different remote objects.

In a further embodiment, activation may result when the threshold is reached, the threshold being derived from motion characteristics determined at a single instant in time.

In an alternative embodiment to the above, activation may result when the threshold is reached, the threshold being determined based on a profile of at least two of the sensed motion characteristic established. As may be appreciated, reference to a single motion characteristic may inherently capture or require reference also to another motion characteristic, particularly when the motion characteristics are measured over a time period as opposed to a single instant of time, the further inherent motion characteristic being time and the way the motion characteristics change over time. Reference herein to a single motion characteristic should not be given strict interpretation and it should be appreciated that the motion characteristic may also use time as a further motion characteristic.

As may be appreciated from the above embodiments, activation may occur when a signature of motion characteristics exceed a chosen threshold while remaining un-activated at all other times. The signature of motion characteristics may be a unique combination of the motion characteristic attributes at a single instant in time. Alternatively, the signature of motion characteristics may be a unique combination of the motion characteristic attributes determined over a period time.

As noted above, activation may occur based on a measured threshold being achieved. Activation may be due to an exceeding action, or alternatively, a decreasing action. For example, the threshold being reached and activation occurring, may only happen when at least one of the measured motion characteristics exceeds a desired threshold. Alternatively, the threshold being reached and activation occurring may only happen when at least one of the measured motion characteristics decreases below a desired threshold. Expressed another way, the term 'activation' covers both activating an action to take place as well as deactivating the action, activation or deactivation being changes or alterations in relationship between the primary system and secondary system.

In one embodiment for example, activation occurs in response to a sudden jerk action in combination with a measured high velocity triggering activation due to a threshold of jerk and velocity or ratio of jerk to velocity (or other relationships) being exceeded. Conversely, in a different mechanism, the opposite set of inputs may trigger the threshold being reached, i.e., the jerk motion characteristics stop and/or the velocity decreases (or the relationship between these two motion characteristics deceases in some manner), the threshold occurring due to a decreased measure. As should be appreciated, either an increase or decrease action may trigger a threshold being reached and activation occurring and reference to one action or the other should not be seen as limiting.

The at least two motion characteristics may be selected as absolute or relative measures from: displacement, force degree and/or direction, velocity, acceleration, deceleration, movement direction, jerk, time reference, and combinations thereof.

The at least two motion characteristics may alternatively or in combination with the above be selected as absolute or relative measures from a modified signal of: displacement, force degree and/or direction, velocity, acceleration, deceleration, movement direction, jerk, and combinations thereof.

By way of example, if the primary system was a pawl or inertial disk and motion of the pawl or inertial disk was damped, the signal from the pawl or inertial disk would be 'modified', damping therefore being the modification means. Equally an electronic signal could be processed and modified, offset, multiplied and so on hence reference to a mechanical embodiment should not be seen as limiting.

In one embodiment the characteristic of motion is displacement or any differential of displacement with respect to time. The first, second, third, fourth, fifth and sixth differentials of displacement with respect to time are velocity, acceleration, jerk, snap (or jounce), crackle and pop respectively. These motion characteristics are physical vector quantities meaning a direction and magnitude defines them. Although most of these motion characteristics are the rate of change of another quantity with respect to time, they can be measured at an instant in time or evaluated over a period of time.

Two or more motion characteristics can be combined in various ways to define a threshold or a set of criteria. Input motion characteristics can be assessed to determine if the threshold has been exceeded or the criteria has been met.

Examples of when a threshold is exceeded may be: when the sum of the measured velocity and acceleration is greater than x, when the measured velocity is greater than x where x is inversely proportional to acceleration at that moment in time. Examples of when a criteria is met may be: when the measured velocity exceeds x and the measured acceleration exceeds y, when the acceleration is greater than x or the displacement is less that y.

It should be noted that the measured motion characteristic value or measure may range from not changing over time, e.g., a constant velocity, or may change slowly over time, e.g., a gradual increase or decrease in acceleration, or may undergo a sudden change, e.g., sudden displacement. Each one of these measured motion characteristics may only provide part of the overall mechanism (or at least primary system) kinematics and hence, why basing a threshold on a plurality of motion characteristics may be important or at least useful. For example, the mechanism may be a fall safety device such as a self retracting lifeline (SRL) and the measured motion characteristics may be displacement of line from a spool along with line acceleration. During a fall, the line acceleration may be gradual or even non-existent if the user was already in motion prior to a fall hence, if only rate of change in acceleration were measured, payout of line may well continue despite the fall since the sensor of acceleration 'sees' or senses no change occurring. When the acceleration rate is sensed in combination or in relation to line displacement from a spool, the mechanism may 'see' that the rate of line payout exceeds a threshold, this threshold equating to a fall scenario and activation resulting in a halt or slowing of line payout being initiated through secondary system activation, the secondary system being a braking mechanism in this example.

Activation may cause at least partial engagement between the at least one primary system and the at least one secondary system or parts thereof. Engagement may be full engagement. Activation may instead by disengagement. Reference is made for brevity herein to the term engagement, however, it should be appreciated that the opposite of disengagement may also be read where the term engagement is referred to and reference to engagement should not be seen as limiting in all cases noted.

The at least partial engagement may be direct. For example, direct may refer to an element or elements of the primary system directly touching and/or mating with an element or elements of the secondary system. The at least partial engagement may instead be indirect. In this case, engagement may be between an element or elements of the primary system activating an additional member or members that in turn engage with the secondary system. In either case, the final result of engagement between the primary and secondary systems or parts thereof, are common whether direct or indirect engagement methods are used.

The at least partial engagement may result in synchronized motion between the at least one primary system and the at least one secondary system. Both systems may for example be in a rotary mechanism, once engaged, spin together with no independent motion between the systems.

The at least partial engagement may cause the at least one secondary system to resist change (in one example being movement) of the at least one primary system. Alternatively, engagement may cause the at least one primary system to resist change of the at least one secondary system.

The at least partial engagement may halt motion of the at least one primary mechanism and the at least one secondary system.

The at least partial engagement may result in change to the interaction with the secondary system.

The at least partial engagement may result in alteration/modification/change to the characteristics of the secondary system.

The at least one sensor may be selected from: at least one mechanical sensor, at least one fluidic sensor, at least one thermal sensor, at least one magnetic sensor, at least one electrical sensor, at least one electronic sensor, and combinations thereof.

A sensor as described herein may be a discrete element or a system of elements comprised such that, in combination, their behavior is sensitive to particular input conditions (such as motion behavior) and optionally, providing a repeatable response to the sensed (motion) behavior. The response noted may provide a signal output to an external system or element, or may act to alter or influence the operational conditions of a related system or element (that is not part of the sensor itself).

As noted above, the sensor may be a non-acting passive element or elements simply sensing the motion characteristic and sending this sensed information to another element. The sensor may instead be an active device that senses and is or are the activation/engagement means or mechanisms. Combinations of both forms of sensor (active and passive) may be used and reference to a passive sensor or active sensor should not be seen as limiting. One example of an active activation/engagement system may for example be a pawl in a rotary system (together being the primary system) where the pawl is velocity sensitive/sensing and which rotates about an axis away from the rotary system when the threshold is reached, the pawl then latching with a secondary system. It should further be appreciated that a component's function for sensing may not limit the ability of the component to provide function in other aspects of the primary system.

One advantage of the described mechanism is that the sensor dynamics may be tuned to vary the primary system dynamics. By way of example, if the sensor were a pawl that senses velocity, the sensitivity of the sensor may be tuned by varying the pawl, for example by varying the pawl shape, varying the pawl center of gravity, varying the pawl pivot point location and by having a bias that restricts pawl movement.

In one embodiment, the at least one primary system may comprise a carriage or rotor and the at least one sensing member may be linked to the carriage or rotor. The at least one sensing member linked to the carriage or rotor may for example be selected from: a pawl, rocker, cam system, latch, disk, carrier, carriage, spool, and combinations thereof. This list should not be seen as limiting since a variety of other sensing members may used.

As noted above, the primary system and sensor may be combined elements. In one example, a combined mechanical sensor/primary system may consist of elements containing, but not limited to; masses, biasing elements, levers, cams, and/or magnetic drag elements. For example, an acceleration sensor may take the form of a mass constrained in the direction of acceleration by a biasing element whose resistance force alters predictably with displacement. The act of applying motion acceleration to a free end of the biasing element in line with the bias device will result in change in the biasing element until a sufficient force is applied to the free mass by the biasing element to accelerate the free mass at the same rate as the external acceleration. As the mass accelerates in proportion to its mass and the force applied, the change in the biasing element may vary for different values of acceleration. In this way, the external acceleration is sensed by the mass and bias device interaction and the level of acceleration may be determined by the level of change in the biasing element.

In another example, a rotational velocity may be sensed through mechanical means by a mass on a rotational element with a degree of motion freedom in the radial direction. Under rotation the mass will exhibit a tendency to accelerate in the radial direction proportional to the square of the rotational velocity. Restraining the mass by a bias device of similar properties to the above example, the radial change in the bias may be referenced to determine the rotational velocity.

The at least one sensor need not provide a discrete output in proportion to the sensed motion to be utilized and effective in the activation of a system. Instead, the at least one sensor may act upon its own elements to provide an activation behavior, or interact with the constraints and/or variables of other systems to affect an activation behavior.

A further sensor may be the use of electrical elements such as switches, electrical generators, and electric solenoids. Although not essential, these may be combined with mechanical elements to form the at least one sensor or sensors. An example of an electric speed sensor is an electrical generator whose electrical voltage output is proportional to the velocity of rotation. In another example, an electric solenoid may be combined with a magnet mass attached to a bias device as detailed in the above mechanical example. The motion of the magnet in the solenoid coil may result in an electrical voltage proportional to the velocity. As the movement of the magnet mass occurs with a change in acceleration, the rate of change in acceleration results in a velocity of the magnet with respect to the solenoid coil. The resulting voltage is therefore proportional to the rate of change of acceleration—i.e., a jerk motion characteristic.

An at least one sensor may comprise electronic components and discrete sensing elements configured to provide a sensor output related to the motion characteristic being measured. Such a sensor may utilize passive elements, or alternatively, may use a processor and/or algorithm in defining the sensor output or response. Alternatively, an electronic sensor may provide output signals for external input into a processor and/or algorithm for subsequent determination of an activation.

The at least one secondary system may be a mechanical mechanism that the primary system or a part thereof engages. The at least one secondary system may for example be: a stop such as a cam plate, or latch plate and combinations thereof. This list should not be seen as limiting since a variety of other mechanical secondary system configurations may used.

The at least one secondary system may alternatively be an electrical or electronic mechanism comprising: a transmission mechanism, a motor, a solenoid, and combinations thereof. This list should not be seen as limiting since a variety of other electrical and electronic secondary system configurations may used. In this embodiment, the at least one secondary system may be a motor or brake that is directly coupled to the primary system and upon activation the motor or brake then provides resistance to movement of the primary system.

In one example, the motor noted above may for example be the secondary system and if so, it may then be coupled to the primary system before activation and the activation causes the motor or brake to be powered to resist or stop the motion.

In a fourth aspect, there is provided a method of controlling a variable behavior control mechanism in a motive system by the steps of:
 (a) providing a mechanism substantially as described above; and
 (b) providing a motive force on the at least one primary mechanism;
 (c) referencing at least two motion characteristics;
 (d) when a threshold is reached based on the reference motion characteristics, activation occurs between the at least one primary system and the at least one secondary system.

The at least one primary member may contain at least one member sensitive to velocity and, at least one member sensitive to acceleration and a carrier in which the at least two members are mounted on.

The at least one acceleration sensitive member has a sensing means that alters the characteristics of the at least one acceleration sensitive member relative to the carrier. The sensing means may for example be a force sensor.

The relative characteristics of the at least one acceleration sensing member may be proportional to the acceleration present.

The characteristics of the at least one velocity sensing member may alter when the velocity passes a threshold, thus engaging or activating the at least one secondary system. The threshold at which the at least one velocity sensitive member changes may be altered by the characteristics of the at least one acceleration sensitive member.

The characteristics of the acceleration sensor may be controlled by at least one bias element and the at least one bias element in turn may alter at least one second bias element between the at least one acceleration sensing member and the at least one velocity sensing member. The bias element or elements may be a spring or springs.

Alternately a single primary member may be mounted to a carrier and may be sensitive to both velocity and acceleration.

The single primary member may be configured in such a way that the forces acting on it due to velocity and acceleration combine, with the combined force altering the characteristics of a single primary member relative to the carrier when a pre-determined threshold is exceeded, thus activating or engaging the at least one secondary system.

Velocity sensing noted above may be achieved in various ways beyond those noted above. For example, the velocity activation system may use the dynamics of a rocker travelling over a ramp and the dynamics making the rocker move into a latched position above a velocity threshold. The rocker resistance to latched position movement may be modified through changing the bias on the rocker in response the acceleration on the system.

Activation in the above example may be at least in part related to velocity, the carrier being a rocker and the velocity sensed using the dynamics of a rocker travelling over a ramp and the dynamics making the rocker move into an activated position above a velocity threshold.

Activation causes the rocker to engage the primary and secondary systems together and/or engage the at least one additional latching member if present.

The rocker resistance to latched position movement is modified through changing the bias on the rocker in response to acceleration on the mechanism or part thereof.

Final embodiments for the mechanism described herein may be varied. For example, an automatic belay device (autobelay) or self retracting lifeline (SRL) embodiment may use the mechanisms. In an SRL embodiment, a line may extend and retract from the SRL device and when the line extends from the SRL device at a rate beyond the threshold, the mechanism engages and applies a retarding force on the rate of line extension. SRL and autobelay applications should not be seen as limiting since the devices described may be used for a wide variety of other applications, non-limiting examples including speed control or load control of:

a rotor in a rotary turbine;
exercise equipment, e.g., rowing machines, epicyclic trainers, weight training equipment;
roller-coasters and other amusement rides;
elevator and escalator systems;
evacuation descenders and fire escape devices;
conveyer systems:
rotary drives in factory production facilities;
materials handling devices such as conveyer belts or a braking device in a chute;
roadside safety systems, e.g., the energy absorber may be connected in a system to provide crash attenuation though the dissipation of energy via the energy absorber, e.g., a roadside barrier or roadside barrier terminal end;
seat belts in vehicles;
zip lines;
braking mechanisms for trolleys and carriages;
bumpstops in transport applications;
bumpstops in crane applications;
torque or force limiting devices in mechanical drive train;
structural overload protection in wind turbines;
load limiting and energy dissipation in structures, buildings and bridges.

Advantages of the above may comprise one or more of:
Differentiation between motion types—the mechanism can be tuned to distinguish different motion types based on the 'signature' of the motion. For example a free falling object is subject to a constant acceleration of 9.81 m/s$^2$ and a linearly increasing velocity while a person walking has a varying acceleration and velocity. Although both motions may reach an equal velocity or acceleration the device can have a different response the each situation;

Short fall distance/lower nuisance lock off occurrence—when the device is used in an SRL, the system can be tuned to quickly active under the correct combination of acceleration and velocity thereby obtaining short fall distance. This would occur in a free fall event. However the same device will be keep false activations during normal work events (nuisance lock off) to a minimum by differentiating the different combinations of accelerations and velocities in these events;

Tuneability—it may be possible to control the sensitivity of the device to the actual and relative values of motion (including velocity and acceleration). Likewise, it may be possible to control the sensitivity of the device to how the effects of motion (for example velocity and acceleration) are combined. Furthermore, using the effects it may be possible to control the threshold of the device at which a secondary system within the device is activated or engaged.

Increased functionality—Based on the tuneability of the device, it is possible for the device to have an increase in functionality when used in specific application, particular where the 'signatures' of the input motion in which the device should not activate are close to those where activation is essential. As will be understood, as the device has the ability to sense and activate from a range of motion characteristics, the combination of the motion characteristics, and the relative thresholds of the characteristics, the accuracy of the device for determining the need to active secondary functions is significantly improved.

Quicker activation times and lower nuisance lock off occurrence—when the device is used in a self retracting lifeline (SRL) application, the activation time for the device can be improved thereby resulting in short fall distances whilst maintaining or reducing in potential nuisance lock-off events. Equally, in seat belt applications, the device can increase the useability of the product by reducing the number of accidental activations of the locking mechanism when the belt is extracted by the users whilst improving the activation time and accuracy during an actual accident or collision;

The mechanism disclosed may overcome the shortcoming of the known art systems in the way noted above, by characterizing the motion of the system through a richer set of characteristic measures. Activation of the mechanism may be determined based on variation of a threshold value of one characteristic motion measure by another (or combination of) characteristic measure(s). Alternatively, the threshold for activation may be determined by the profile of one or more characteristic measures values considered with respect to a time reference. This may be achieved mechanically, electrically/electronically, or a combination of both. The characteristic of motion may be determined instantaneously at a point in time, or over a time period.

Processors and/or algorithms may further be utilized alongside the mechanism to further tune the mechanism dynamics thus providing greater mechanism versatility.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

WORKING EXAMPLES

The above described control mechanism and method of use are now described by reference to specific examples.

Example 1

As noted in the detailed description above, one activation sensing mechanism may sense at least two motion characteristics on a primary system.

This embodiment is described in more detail below with reference to FIG. 1 which shows a stylized mechanism with a primary system 1, a secondary system 2 and, a force in direction F applied on the primary system 1 that causes motion M of the primary system 1. A sensor 3 may be located on the primary system 1 that measures two motion characteristics.

Figure 2:
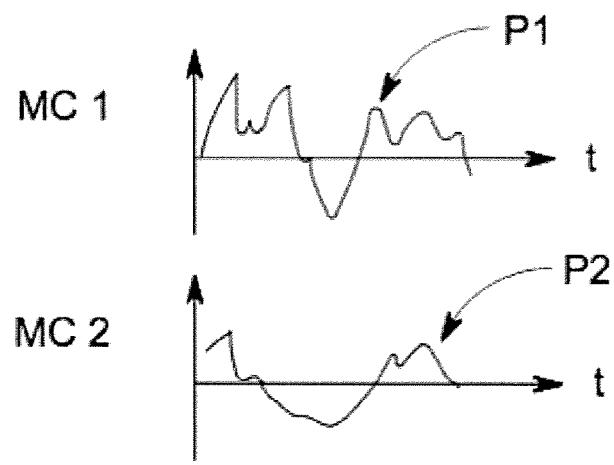
FIG. 2 illustrates graphs showing possible profiles over time of the first and second motion characteristics.

FIG. 2 in the upper graph shows a possible profile P1 of the first motion characteristic MC1 as measured over time t on the x-axis and the first motion characteristic measure MC1 on the y-axis, e.g., displacement, force degree and/or direction, acceleration, jerk, velocity and so on. The FIG. 2 bottom graph shows a possible profile P2 of the second motion characteristic MC2 as measured over the same time period, time being on the x-axis, and the second motion characteristic MC2 measure on the y-axis.

Figure 3:
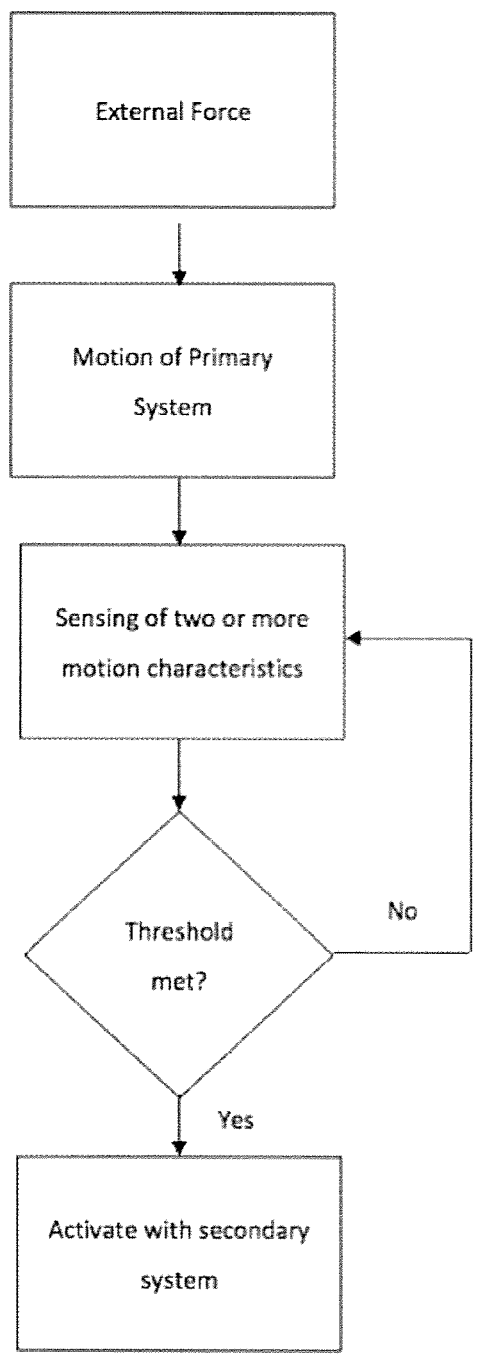
FIG. 3 is a flow diagram illustrating a process of operation of the mechanism.

FIG. 3 is a flow diagram illustrating the process of operation beginning with an external force being imposed, causing motion of the primary system, sensing then commenced of two or motion characteristics, a decision step testing whether the motion characteristics have reached a threshold and if not, repeating the sensing step, and if yes, activation occurs with the secondary system.

Note that in this example activation may occur by a direct action of the sensor causing activation with the secondary system, for example by causing primary and secondary system engagement.

Example 2

As noted in the detailed description above, one activation sensing mechanism may sense at least two motion characteristics one motion characteristic being directly on the primary system and another at a point remote to the primary system.

Figure 4:
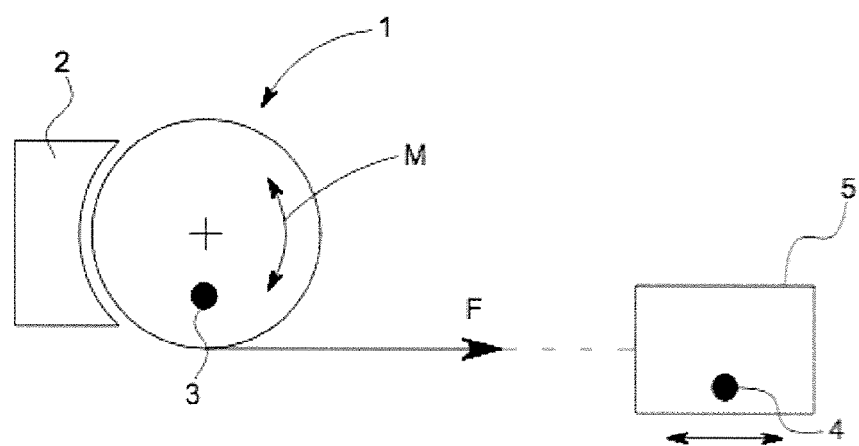
FIG. 4 illustrates an alternative embodiment of the activation mechanism.

This embodiment is described in more detail below with reference to FIG. 4 which shows a stylized mechanism with a primary system 1, a secondary system 2 and, a force in direction F applied on the primary system 1 that causes motion M of the primary system 1. A first sensor 3 may be located on the primary system 1 that may measure two motion characteristics MC1, MC2 while a second sensor 4 located distal to the primary system 1 and sensor 3 may be located on another object 5, e.g., a person or weight attached distant to the primary system 1 and the second sensor 4 may measure two motion characteristics MC3, MC4 of the person or weight 5.

Figure 5:
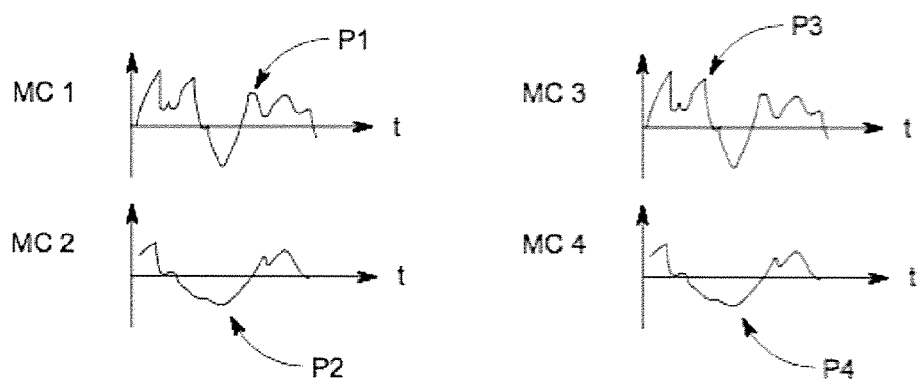
FIG. 5 illustrates graphs showing possible profiles over time of the first and second motion characteristics.

FIG. 5 in the left hand graphs show possible profiles P1, P2 sensed by the first sensor of the first and second motion characteristics MC1, MC2 as measured over time (time t being on the x-axis and the motion characteristic measures MC1, MC2 being on the y-axis, e.g., displacement, force degree and/or direction, acceleration, jerk, velocity and so on). FIG. 5 on the right hand side shows possible profiles P3, P4 of the second sensed motion characteristics MC3, MC4 as measured over the same time period, time t again being on the x-axis, and the motion characteristic measure on the y-axis.

The flow diagram shown in FIG. 3 also applies to this system albeit using different sensor configuration and measuring four motion characteristics MC1, MC2, MC3, MC4.

Note that in this example activation may occur by a combination of direct 3 and indirect 4 sensing causing activation with the secondary system 2, activation being via a direct action of the first sensor 3 causing activation.

Example 3

As noted in the detailed description above, a further activation sensing mechanism may sense at least two motion characteristics at an instant of time and base activation on the sensed characteristics at the instant of time.

This embodiment is described in more detail below with reference to the mechanism of FIG. 1 again.

Figure 6:
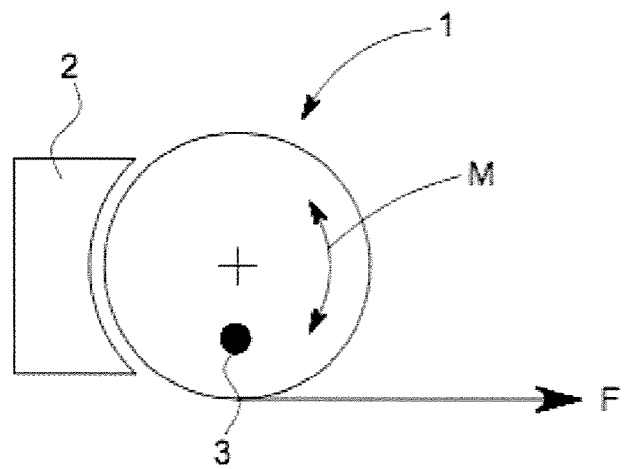

FIG. 6 in the graphs show possible profiles P1, P2 sensed by the first sensor 3 of the first and second motion characteristics MC1, MC2 as measured over time (time t being on the x-axis and the motion characteristic measures being on the y-axis (e.g., displacement, force degree and/or direction, acceleration, jerk, velocity and so on). The motion characteristics MC1, MC2 may be measured at a single instant of time $t_i$ denoted by the dashed line AA, this time $t_i$ equating for example to a specific pre-determined moment or this instant of time being one of a number of time instants that the sensor 3 senses.

The flow diagram shown in FIG. 3 also applies to this system albeit using sensor 3 timing $t_i$ based around measuring characteristics MC1, MC2 at a single instant $t_i$ or instants of time $t_i$.

Note that while direct sensing 3 is indicated in FIG. 1, the same principle of sensing at an instant of time $t_i$ may apply to the direct 3 and indirect 4 sensing mechanism of Example 2.

Example 4

Example 3 illustrated measurement at an instant of time. By contrast, the mechanism may sensing the two or more motion characteristics over a period of time and basing activation on the system behavior over time, more like a signature of motion or mechanism behavior.

Figure 7:
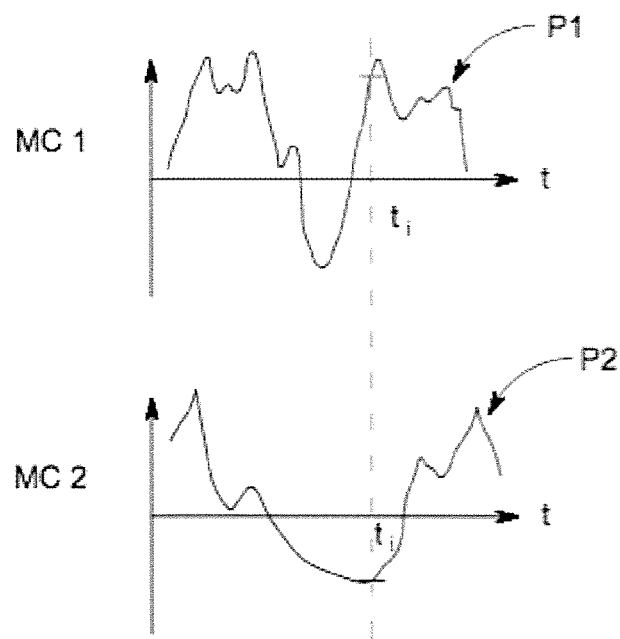
FIG. 7 illustrates graphs showing possible profiles sensed by the first sensor of the first and second motion characteristics as measured at an instance of time.

Using the same mechanism is that shown in FIG. 1, the resulting graphs shown in FIG. 7 show possible profiles P1, P2 sensed by the first sensor 3 of the first and second motion characteristics MC1, MC2 as measured over time (time t being on the x-axis and the motion characteristic measures being on the y-axis). The motion characteristics MC1, MC2 may be measured over a selected time period $t_p$ shown in shading, this time period $t_p$ equating for example to a specific pre-determined time period or being one of a number of time periods $t_p$ that the sensor 3 senses.

Figure 8:
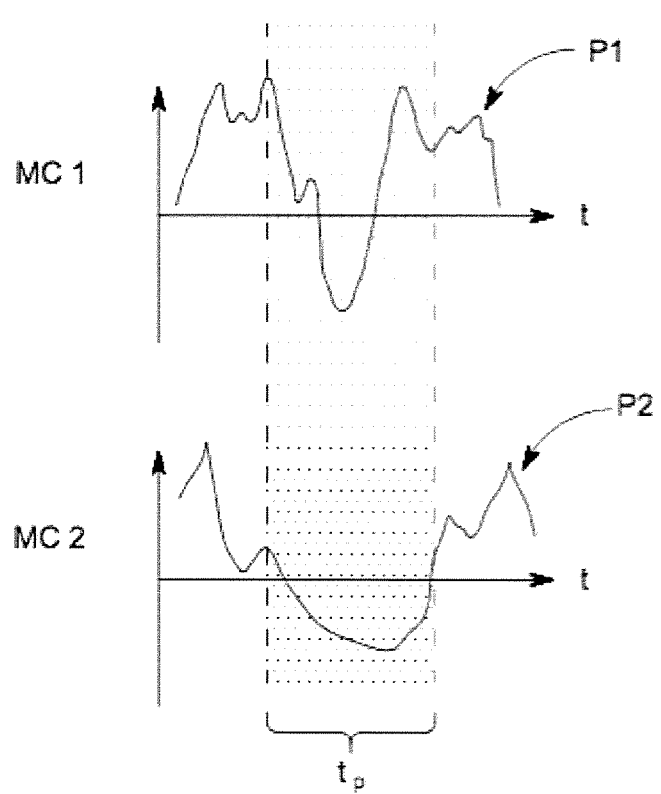
FIG. 8 illustrates possible profiles sensed by the first sensor of the first and second motion characteristics as measured over time according to a further embodiment.

In this mechanism, the flow diagram may be slightly different as shown in FIG. 8. Steps of imposing an external force and subsequent primary system movement remain the same. The next step of sensing occurs over a time period $t_p$. The threshold decision step is then one of comparing the time period $t_p$ sensed motion characteristics against a library of signature motion characteristic profiles or a motion profile set. If the sensed time period characteristics meet with the library 'normal' operation characteristics, measurement may then recommence over a further time period. If the motion characteristics over the time period noted fall outside the 'normal' range as determined by the library of profiles, activation may then occur.

Figure 9:
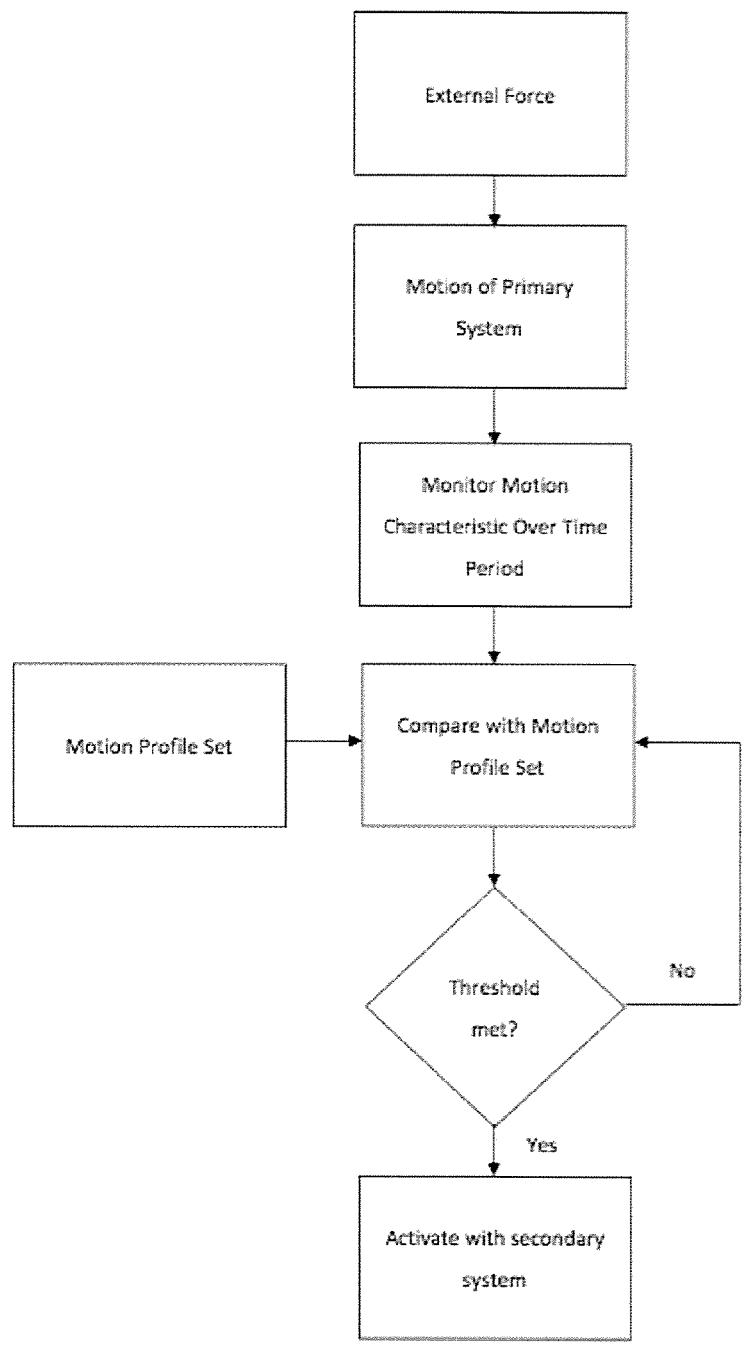
FIG. 9 illustrates a flow diagram of operation of the above further embodiment.

The process may also follow the flow diagram shown in FIG. 9 where, between collecting the sensed characteristic information of the time period and the threshold decision step, an algorithm may be applied to the sensed time period information to alter the data collected. For example, the time period data collected may be amplified, one characteristic weighted over the other and so on. Once the algorithm is applied, the threshold decision is then completed as per the FIG. 9 process.

Example 5

In this Example, an embodiment is described where activation is based on at least two measured motion characteristics acting in conjunction directly to activate against a threshold, the threshold being set by a bias spring.

Figure 10:
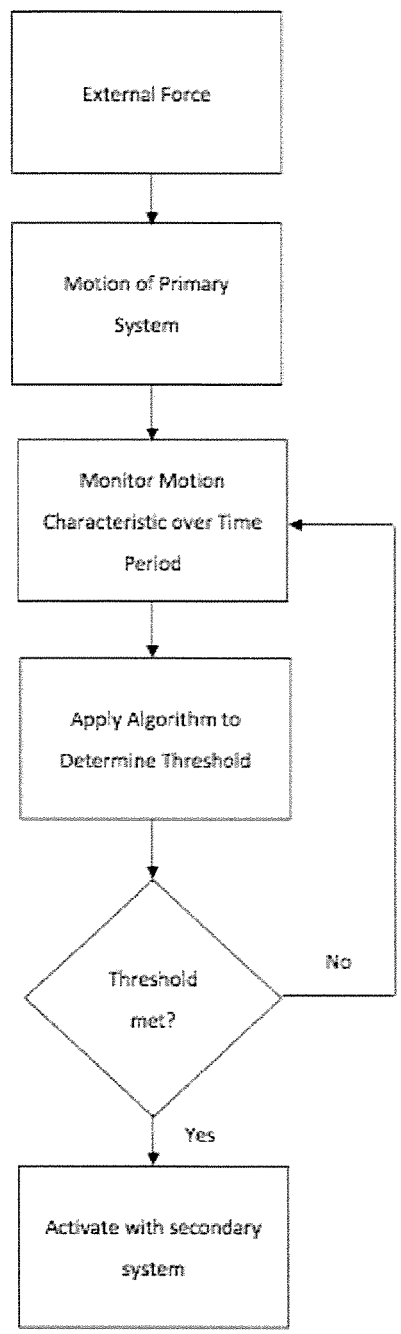
FIG. 10 illustrates an alternative flow diagram of operation of the above further embodiment.

FIG. 10 illustrates a potential mechanism with the above activation process. The mechanism 20 shown may have a shaft 21 with primary system rotating about the shaft 21, the primary system comprising an inertial ring 22 and pawl 23. The secondary system 24 is a latch member 25 that surrounds the primary system. One motion characteristic (acceleration) influences the threshold of activation for sensing on another motion characteristic (velocity) where the pawl 23 acts as a velocity sensor and the inertial ring 22 acts as an acceleration sensor. On application of a force, for example to the shaft 21, the inertial ring 22 rotates, and when the velocity and acceleration motion characteristics reach or exceed a threshold, in this case being when one or both motion characteristics (velocity and acceleration) reach or exceed a magnitude sufficient to overcome a spring bias 26, the inertial ring 22 responds to acceleration and the pawl 23 responds to velocity so that the primary system moves relative to the shaft 21 and the inertial ring 22 and pawl 23 engage with an outer secondary system 24 latch member 25. In the embodiment shown, distance 'd' is the moment arm for centrifugal force. As may be appreciated, both motion characteristics velocity and acceleration act directly on the pawl 23 and act in combination.

Figure 11:
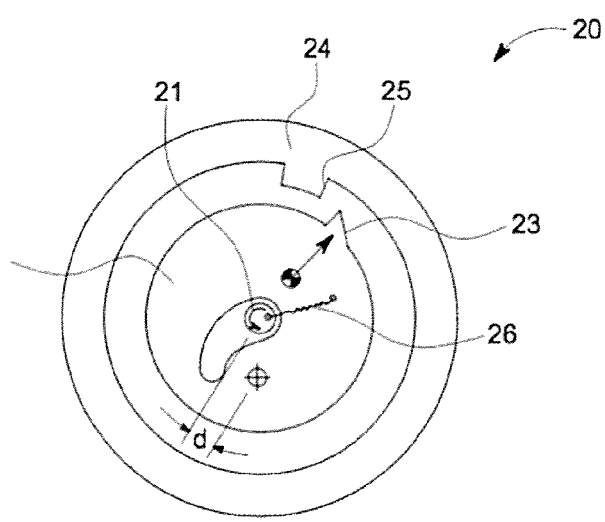
FIG. 11 illustrates a further alternative embodiment of the activation mechanism.

The activation process for this mechanism is further described in the flow diagram of FIG. 11. Each sensed motion characteristic (e.g., velocity and acceleration) are added together at an equal weighting and a threshold decision occurs against a given threshold (e.g., the spring bias). If the threshold is not reached, further sensing occurs and, if activation does occur, the mechanism activates.

Example 6

As an alternative to the additive weighting or even weighting described in Example 5, the different characteristics may be given a varied weighting relative to one another to achieve and different activation threshold.

Figure 12:
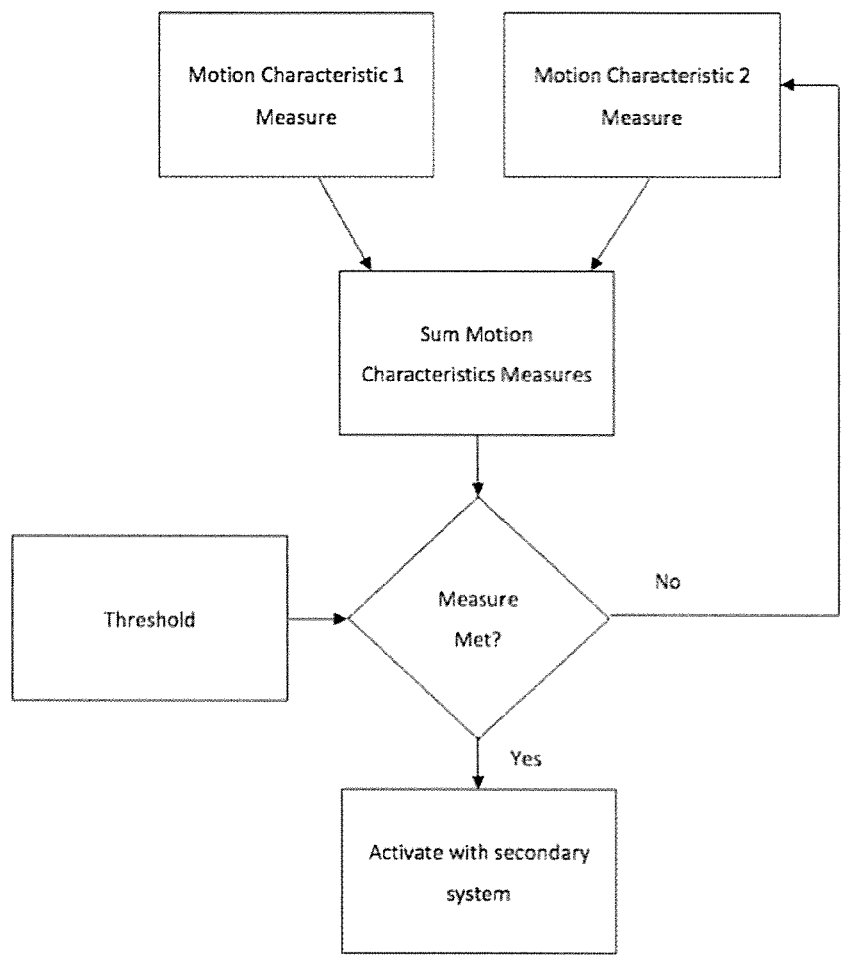
FIG. 12 illustrates a flow diagram of operation of the above further embodiment.
Figure 13:
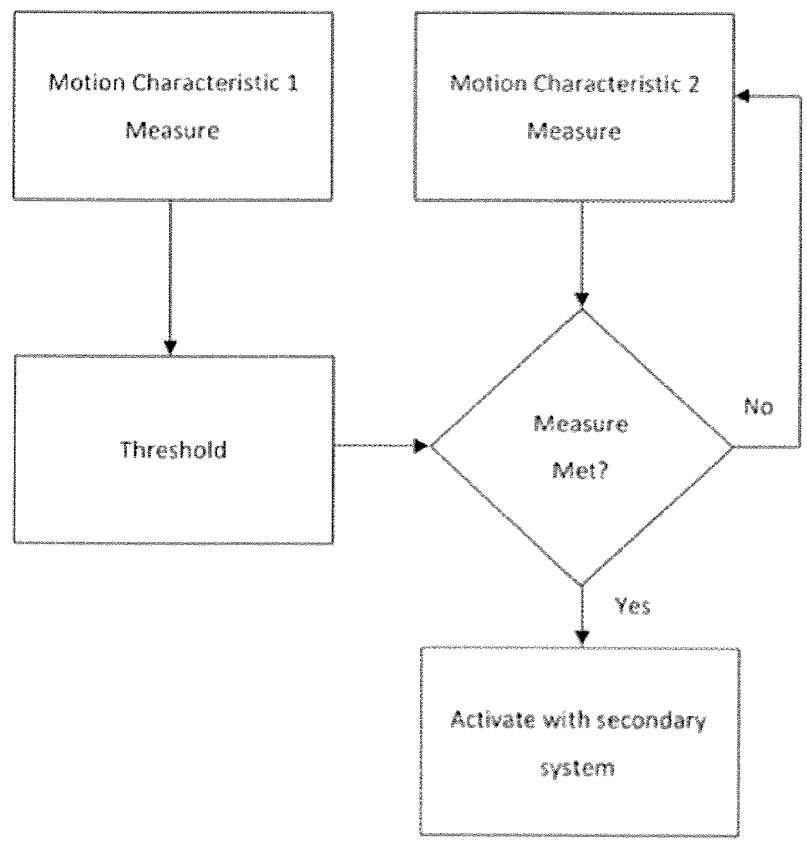
FIG. 13 illustrates a flow diagram of operation of a yet further embodiment.

Using the basic mechanism of Example 1 and FIG. 1 and referring to the flow diagram of FIG. 12, the mechanism may measure two motion characteristics via two different sensors. A measured first motion characteristic may provide a threshold limit and the measured second motion characteristic is compared to the first motion characteristic, activation only occurring when the second motion characteristic achieves the first motion characteristic threshold. Using this mechanism, the threshold may vary as opposed to being a fixed measure for all sets off motion characteristic. The graphs shown in FIG. 13 further illustrate this mechanism where the first motion characteristic measurement MC1 profile P1 varies over time as shown in the right hand side graph. The left hand side graph shows the measured behavior of the second motion characteristic MC2 profile P2 over time with the first motion characteristic MC1 profile P1 superimposed (the dotted line). Activation might only occur for example at point BB when the second measured motion characteristic MC2 achieves the first measured motion characteristic.

Example 7

In this example a more practical approach is shown of the mechanism of Example 7 above where activation results when one motion characteristic, e.g., acceleration, influences the threshold of activation for sensing on another motion characteristic, e.g., velocity.

Figure 14:
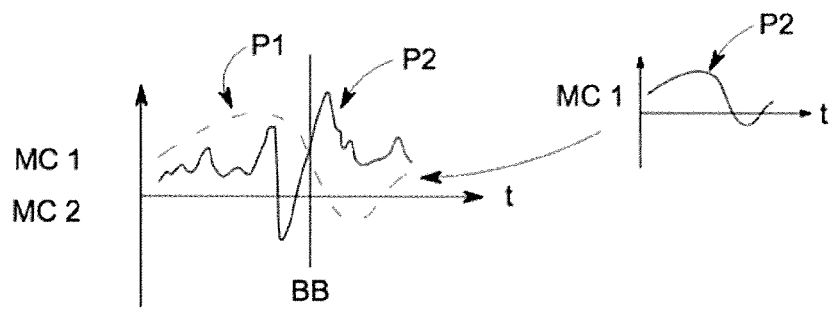
FIG. 14 illustrates possible profiles sensed by the first sensor of the first and second motion characteristics as measured over time according to the above further embodiment.

As shown in FIG. 14, the activation mechanism may comprise a pawl 50 mounted on a rotating disk 51 that is retained by a bias element 52 (magnet, spring etc.) between the pawl 50 and an inertial mass 53 also mounted on the rotating disk 51. When the disk 51 is spinning, a centripetal force is present on the pawl 50 that acts against the bias element 52. Another bias element 54 is present between the rotating disk 51 and the inertial mass 53. Upon rotational acceleration of the disk 51, the inertial mass 53 acts against the bias element 52 and rotates relative to the disk 51, moving the pawl 50 bias element 52 closer to the pawl 50 pivot axis 55, thereby reducing the restraining torque and lowering the rotational velocity at which the pawl 50 overcomes the bias element 52. When the disk 51 is spinning at a constant velocity or subjected to only a small acceleration the bias element 52 between the pawl 50 and the inertial mass 53 remains further away from the pawl 50 pivot axis 55, thus providing a higher restraining torque, requiring a greater rotational velocity for the pawl 50 to overcome the bias element 52. When the pawl 50 overcomes the bias element 52 a secondary stopping or braking system 56 is engaged (activation).

Figure 15:
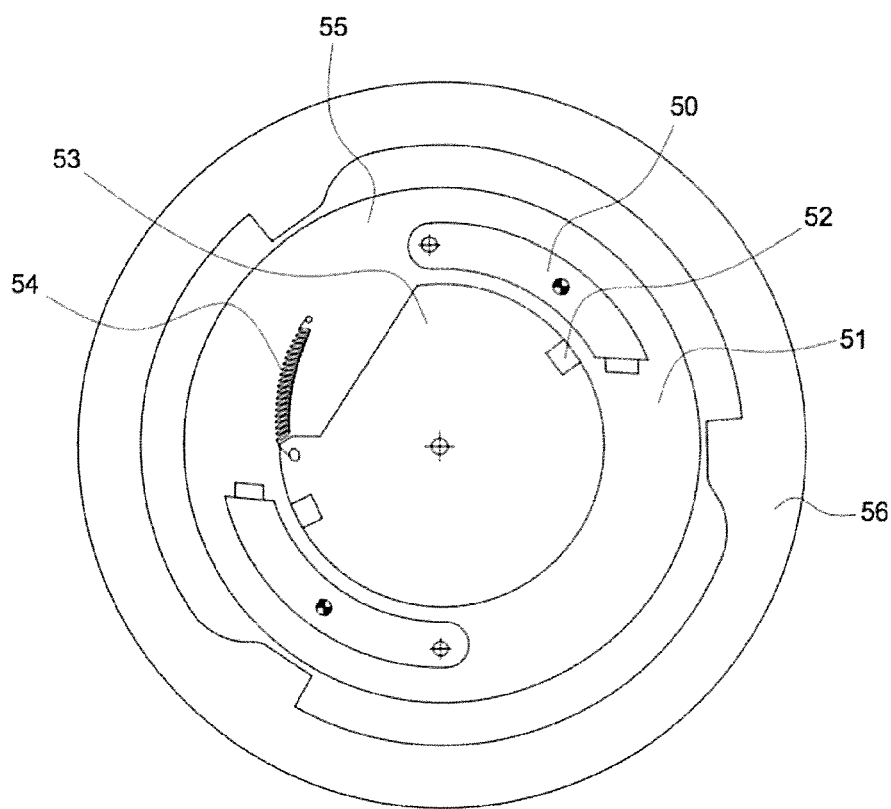
FIG. 15 illustrates a rotary mechanism embodiment where activation results when one motion characteristic influences the threshold of activation for sensing on another motion characteristic.
Figure 16:
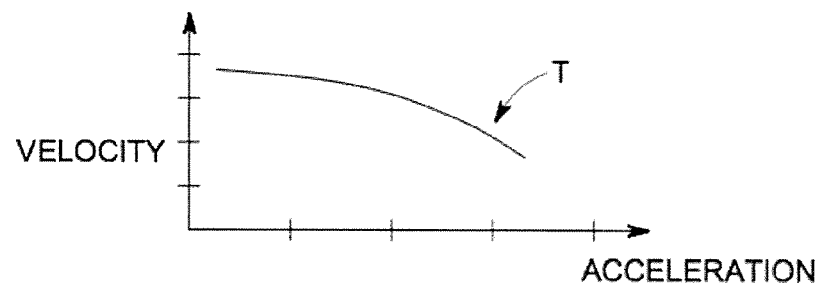
FIG. 16 illustrates a first graphed profile for a sensed combination of motion characteristics based on the above rotary mechanism embodiment.
Figure 17:
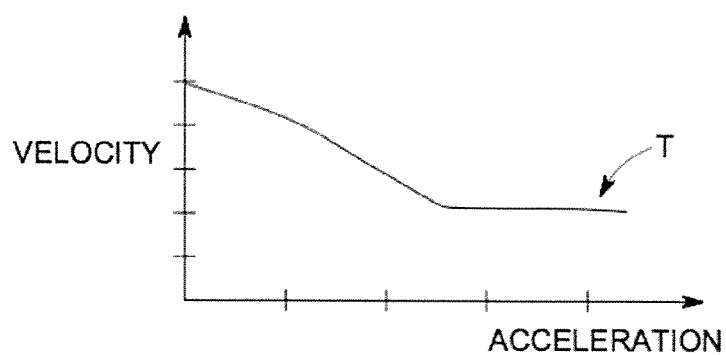
FIG. 17 illustrates a second graphed profile for a sensed combination of motion characteristics based on the above rotary mechanism embodiment.

The possible resulting profiles for the above mechanism, assuming velocity and acceleration are the motion characteristics might look as per:

FIG. 15 where the threshold T is reached when a combination of high acceleration and low velocity occurs, the profile changing via a curved path;

FIG. 16 where the threshold T is reached when a combination of high acceleration and low velocity occurs, the profile changing in a linear step manner; or FIG. 17 where the threshold T is reached when a combination of a high acceleration and high velocity occurs and the profile changing in a relatively linear manner. As should be appreciated, the exact profile will be dependent on the system dynamics.

Example 8

In this Example a more practical approach is described illustrating a mechanism using multiple sensors located on and acting directly on the primary system along with an indirect sensor, the combination of sensors being both mechanical and electronic sensors.

Figure 18:
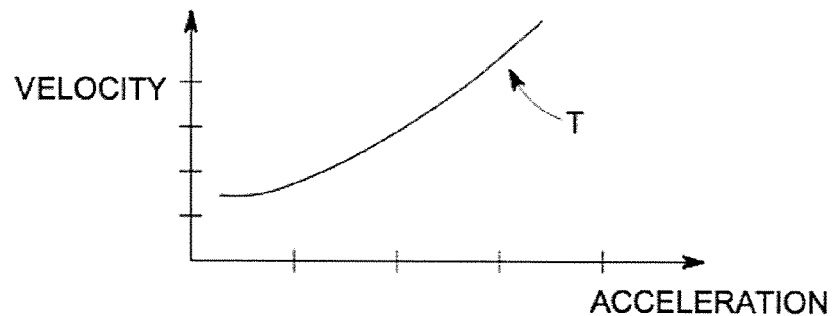
FIG. 18 illustrates a third graphed profile for a sensed combination of motion characteristics based on the above rotary mechanism embodiment.

FIG. 18 shows the embodiment noted. The mechanism has a primary system comprising a rotor 30 mounted to a shaft 31. The rotor 30 rotates on application of a force to the shaft 31. Located on the rotor 30 distal to the shaft 31 is a motion sensor 32 that may be used to sense changes in shaft 31 acceleration. The rotor 30 may also have a pawl 33 that pivots from the rotor 30 due to centrifugal force, the pawl 33 pivot point 34 offset from the rotor 30 shaft 31. The pawl 33 may be a velocity sensor. A third sensor 35 may also be used, in this example being an electronic controller 35 that receives at least one of the sensed motion characteristics shown in the Figure as receiving the motion sensor 32 sensed motion characteristic (acceleration). The controller 35 in turn varying a threshold varying device 36, in this case being a solenoid 36 on the rotor 30 that provides a bias force against pawl 33 rotating outwards relative to the rotor 30 due to centrifugal force F. Not shown for clarity is a secondary system around at least part of the primary system. When the threshold is reached or exceeded, the pawl 33 rotates about the pivot point 34 away from the rotor 30 shaft 31 axis of rotation and the pawl 33 engages with the secondary system or a part thereof.

Example 9

Figure 19:
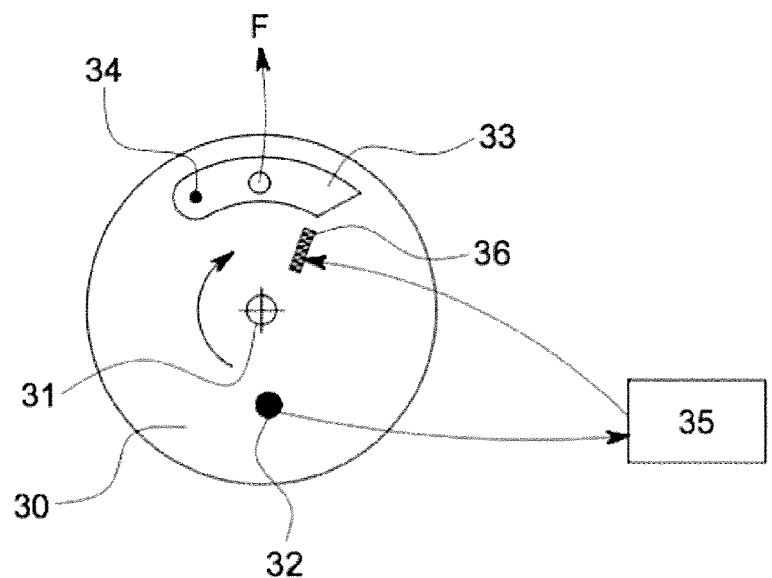
FIG. 19 illustrates a further embodiment of a mechanism using multiple sensors located on and acting directly on the primary system along with an external controller/processor.

FIG. 19 illustrates a linear embodiment of the mechanism.

The primary system in this embodiment may be a carriage 40 that a pawl 41 is rotatingly linked to about axis 42. The pawl 41 may be paramagnetic and, when the primary system moves by carriage 40 motion M through a magnetic field 43 shown as the shaded area in FIG. 20, an eddy current drag force is imposed on the pawl 41 urging rotating movement of the pawl 41 about the pivot axis 42. A secondary system 44 may be engaged by the pawl 41 when rotation occurs. The pawl 41 may be a first sensor that is sensitive to velocity and a force sensor 45 may be located on the pawl 41 being a second sensor motion characteristic. A spring 46 may be located between the pawl 41 and carriage 40 that acts to provide a threshold and it is only when the sensed motion characteristics reach a predetermined level that the threshold is overcome and the pawl 41 may activate with the secondary system 44.

Example 10

Figure 20:
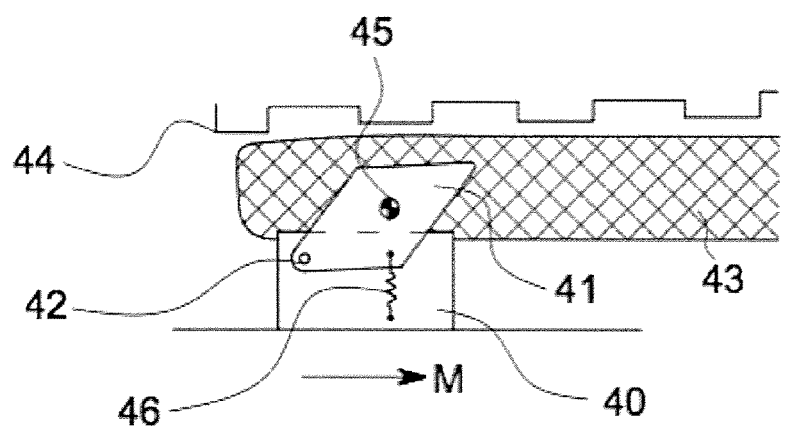
FIG. 20 illustrates a further embodiment of a rotary embodiment where the primary system and secondary system are coupled and the secondary system is motor, the activation of the system occurring when the motor is controlled by a controller and/or processor to provide resistance to motion.

FIG. 20 illustrates a further embodiment using a primary system with a rotating rotor 50 that rotates on application of a force F to the rotor 50. The rotor 50 may have sensors 51 (only one shown for clarity) and the sensed motion characteristics are received and measured by a controller 52 such as a processor or micro-processor. The controller 52 need not be directly on the primary system 50, 51 or a part thereof as illustrated schematically in FIG. 20. The controller 52 compares the sensed motion characteristics against a database of known motion characteristic measurements and/or profiles and determines if the sensed motion characteristics have reached or exceeded a threshold. Alternatively, the controller may compare the motion characteristic values against a set threshold level. On activation, the controller 52 operates a motor 53 (a secondary system) that resists or halts the primary system (rotor 50 and sensors 51) rate of rotation.

Example 11

Figure 21:
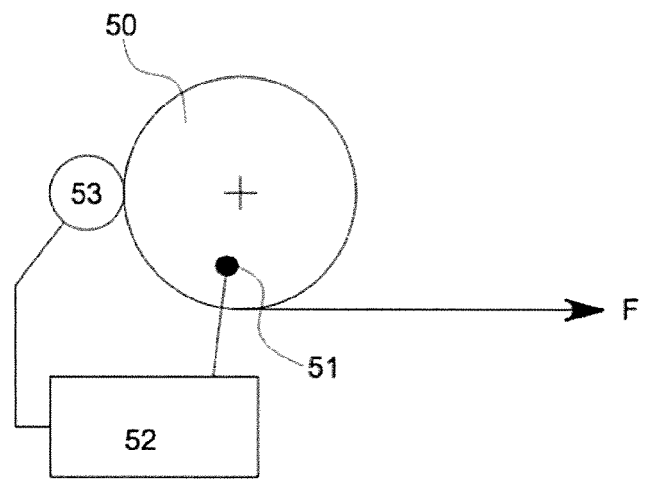
FIG. 21 illustrates an alternative linear embodiment of the activation mechanism.

FIG. 21 illustrates a further rotary embodiment, the activation mechanism having a pawl 60 mounted to a rotating disk 61 retained by a bias element 62. The pawl 60 is affected by centripetal force due to rotational velocity as well as inertial force caused by acceleration, both of which act against the bias element 62. The pawl 60 moves relative to the disk 61 when the combination of velocity and acceleration achieves a predetermined threshold, thus engaging the secondary stopping or braking system 63.

Example 12

Figure 22:
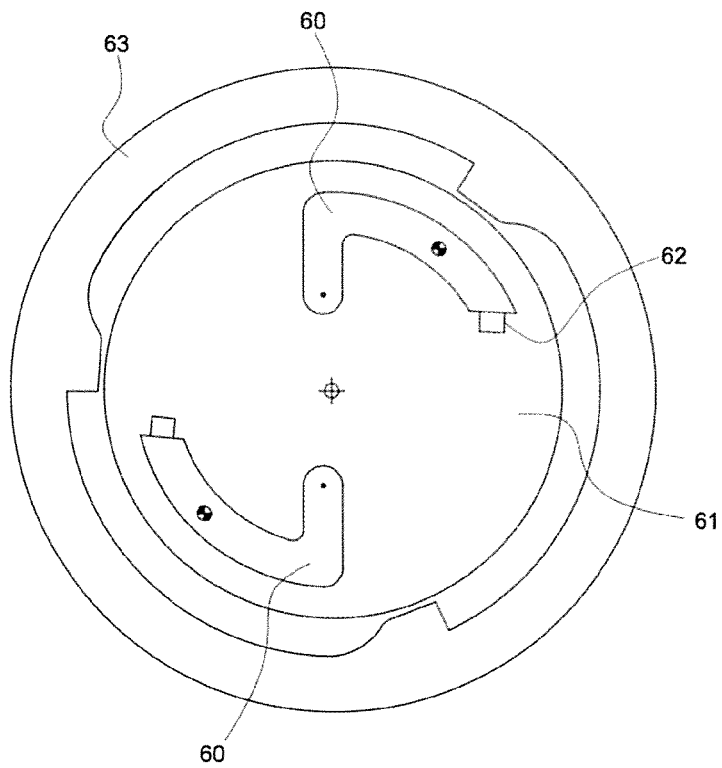
FIG. 22 illustrates a further alternative rotary embodiment of the activation mechanism.
Figure 23:
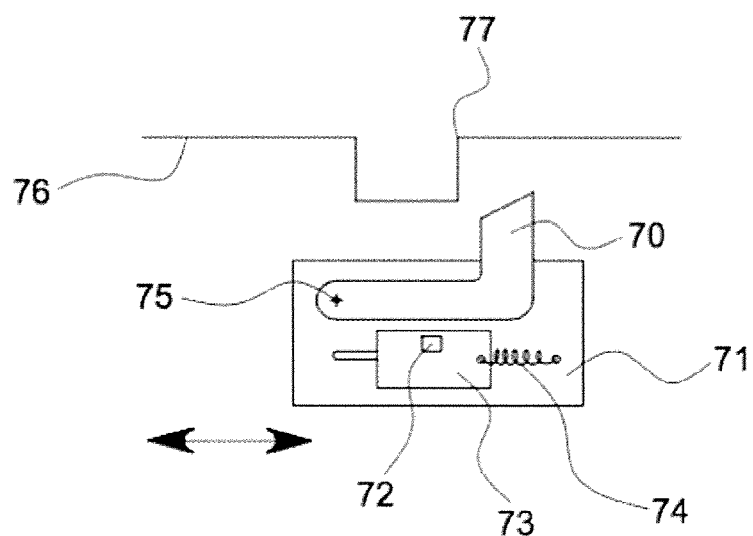
FIG. 23 illustrates a further alternative linear embodiment of the activation mechanism.

FIG. 22 illustrates an alternative linear embodiment of the activation mechanism comprising a pawl 70 mounted to a carriage 71, the pawl 70 being retained by a bias element 72 connected to an inertial mass 73. The inertial mass 73 has a bias element 74 connected to the carriage 71. A drag force proportional to velocity acts on the pawl 70 against the bias element 72, upon acceleration the inertial mass 73 moves relative to the carriage 71, against the bias element 74, thereby moving the bias element 74 closer to the pawl 70 pivot axis 75, reducing the restraining torque and therefore the velocity at which the pawl 70 is released. When the carriage 71 velocity is constant or subjected to a small acceleration, the pawl bias element 72 remains further from the pawl 70 pivot axis 75, thus providing a higher restraining torque, requiring a greater velocity for the pawl 70 to overcome the bias element 74. When a combination of velocity and acceleration achieves a predetermined threshold, the pawl 70 is released and activates with the secondary stopping or braking system 76 by engaging the pawl 70 with an adjacent latching point 77.

Aspects of the variable behavior control mechanism and method of use have been described by way of example only and it should be appreciated that modifications and additions may be made thereto without departing from the scope of the claims herein. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A mechanism, comprising:
  a primary system configured to undergo motion when a force is imposed on the primary system, the primary system comprising a moving member and at least one further member linked to the moving member, the at least one further member acting as a first motion characteristic sensor that senses at least two motion characteristics of the primary system; and
  a secondary system;
  wherein, below a threshold of sensed motion characteristics, the primary system and secondary system remain kinematically independent of one another, and, above the threshold of sensed motion characteristics, the at least one further member moves to cause direct engagement between the primary system and the secondary system, thereby slowing or stopping independent kinematic motion between the primary system and the secondary system;
  wherein the at least one further member of the primary system comprises a pawl sensing primary system velocity and an inertial mass sensing primary system acceleration, the pawl and inertial mass retained together via a bias element, wherein the moving member of the primary system comprises a rotatable disk rotatably movable about a central axis, wherein, in use, the primary system undergoes motion according to a kinematic relationship when a force is imposed on the rotatable disk, the pawl having a centripetal force acting thereon when the rotatable disk spins, this centripetal force acting against the bias element;

wherein the secondary system is kinematically independent to and surrounds at least part of the primary system, the secondary system comprising a latch member.

2. The mechanism of claim 1 wherein the at least two motion characteristics of the primary system comprise velocity and acceleration and wherein:
   below a threshold of acceleration and/or velocity of the primary system, the primary and the secondary systems remain independent; and
   above a threshold of acceleration and/or velocity of the primary system, the primary system pawl engages the secondary system latch member so that the primary system and secondary system engage and are no longer kinematically independent.

3. The mechanism of claim 2 wherein the at least two motion characteristics of the primary system are rotational velocity and rotational acceleration.

4. The mechanism of claim 3 wherein the primary system is configured so that upon rotational acceleration of the rotatable disk, a rotational velocity threshold at which the pawl overcomes the bias element so as to engage the secondary system latch member is reduced in comparison to a rotational velocity threshold at which the pawl overcomes the bias element to engage the secondary system latch member when the rotatable disk is rotating at constant velocity.

5. The mechanism of claim 2 wherein the primary system is configured so that when a combination of velocity and acceleration achieves a predetermined threshold, the pawl overcomes the bias element to engage the secondary system latch member.

6. The mechanism of claim 2 wherein an exceeding of a threshold of acceleration and/or velocity for activation of the primary system to engage the secondary system is sensed mechanically, and the exceeding of the threshold is not sensed electrically or electronically.

7. The mechanism of claim 1 wherein the bias element via which the pawl and inertial mass are retained together comprises a spring.

8. The mechanism of claim 1 wherein the inertial mass is an inertial disk or an inertial ring.

9. The mechanism of claim 1 wherein the at least one further member of the primary system comprises at least two pawls.

10. The mechanism of claim 1 wherein the first motion characteristic sensor is a mechanical sensor, and the first motion characteristic sensor does not include a magnetic sensor, an electrical sensor, or an electronic sensor.

11. The mechanism of claim 1 wherein the sensing of the at least two motion characteristics of the primary system is performed instantaneously.

12. The mechanism of claim 1 wherein the sensing of the at least two motion characteristics of the primary system is performed over a period of time.

13. The mechanism of claim 1 wherein the rotatable disk, the inertial mass and the pawl comprise a common axis of rotation that is the central axis about which the rotatable disk rotatably moves.

14. The mechanism of claim 13 wherein the mechanism comprises a shaft that defines the central axis about which the rotatable disk rotates, and wherein the inertial mass and the pawl are rotatable about the shaft that defines the central axis about which the rotatable disk rotates.

15. The mechanism of claim 13 wherein the secondary system is a radially outer system that circumferentially surrounds the primary system.

16. The mechanism of claim 1 wherein the secondary system comprises a rotary mechanism that, upon the engagement between the primary system and the secondary system, rotates with the primary system.

17. A fall protection apparatus comprising:
   a primary system configured to undergo motion when a force is imposed on the primary system, the primary system comprising a moving member and at least one further member linked to the moving member, the at least one further member acting as a first motion characteristic sensor that senses at least two motion characteristics of the primary system; and
   a secondary system;
   wherein, below a threshold of sensed motion characteristics, the primary system and secondary system remain kinematically independent of one another, and, above the threshold of sensed motion characteristics, the at least one further member moves to cause direct engagement between the primary system and the secondary system, thereby slowing or stopping independent kinematic motion between the primary system and the secondary system;
   wherein the at least one further member of the primary system comprises a pawl sensing primary system velocity and an inertial mass sensing primary system acceleration, the pawl and inertial mass retained together via a bias element, wherein the moving member of the primary system comprises a rotatable disk rotatably movable about a central axis, wherein, in use, the primary system undergoes motion according to a kinematic relationship when a force is imposed on the rotatable disk, the pawl having a centripetal force acting thereon when the rotatable disk spins, this centripetal force acting against the bias element;
   wherein the secondary system is kinematically independent to and surrounds at least part of the primary system, the secondary system comprising a latch member.

18. A self-retracting lifeline comprising:
   a primary system configured to undergo motion when a force is imposed on the primary system, the primary system comprising a moving member and at least one further member linked to the moving member, the at least one further member acting as a first motion characteristic sensor that senses at least two motion characteristics of the primary system; and
   a secondary system;
   wherein, below a threshold of sensed motion characteristics, the primary system and secondary system remain kinematically independent of one another, and, above the threshold of sensed motion characteristics, the at least one further member moves to cause direct engagement between the primary system and the secondary system, thereby slowing or stopping independent kinematic motion between the primary system and the secondary system;
   wherein the at least one further member of the primary system comprises a pawl sensing primary system velocity and an inertial mass sensing primary system acceleration, the pawl and inertial mass retained together via a bias element, wherein the moving member of the primary system comprises a rotatable disk rotatably movable about a central axis, wherein, in use, the primary system undergoes motion according to a kinematic relationship when a force is imposed on the rotatable disk, the pawl having a centripetal force acting thereon when the rotatable disk spins, this centripetal force acting against the bias element;

wherein the secondary system is kinematically independent to and surrounds at least part of the primary system, the secondary system comprising a latch member.

19. The self-retracting lifeline of claim 18, further comprising an extendable and retractable line, wherein upon the engagement of the primary system pawl with the secondary system latch member, a retarding force is applied on a rate of extension of the extendable and retractable line.

* * * * *